(12) United States Patent
Li et al.

(10) Patent No.: US 12,700,812 B2
(45) Date of Patent: Aug. 4, 2026

(54) METHOD FOR IMPROVING EFFICIENCY OF MICRO-INVERTER AND DUAL-ACTIVE-BRIDGE-TYPE MICRO-INVERTER

(71) Applicant: SHANGHAI JIAO TONG UNIVERSITY, Shanghai (CN)

(72) Inventors: Rui Li, Shanghai (CN); Jiatao Yang, Shanghai (CN); Yangyang Feng, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 275 days.

(21) Appl. No.: 18/703,364

(22) PCT Filed: May 6, 2023

(86) PCT No.: PCT/CN2023/092411

§ 371 (c)(1),
(2) Date: Apr. 22, 2024

(87) PCT Pub. No.: WO2023/226724

PCT Pub. Date: Nov. 30, 2023

(65) Prior Publication Data

US 2025/0239945 A1 Jul. 24, 2025

(30) Foreign Application Priority Data

May 26, 2022 (CN) ........................ 202210589560.X
May 26, 2022 (CN) ........................ 202210590592.1

(51) Int. Cl.
*H02M 7/797* (2006.01)
*H02M 3/335* (2006.01)

(52) U.S. Cl.
CPC ........ *H02M 7/797* (2013.01); *H02M 3/33573* (2021.05); *H02M 3/33584* (2013.01)

(58) Field of Classification Search
CPC ...... H02M 7/519; H02M 7/521; H02M 7/523; H02M 7/75; H02M 7/757; H02M 7/7575;
(Continued)

(56) References Cited

U.S. PATENT DOCUMENTS 9,825,545 B2 * 11/2017 Chen .................... H02M 3/335
10,454,381 B2 * 10/2019 Li ............................ H02J 7/04
(Continued)

FOREIGN PATENT DOCUMENTS

CN 103208923 7/2013
CN 103310055 9/2013
(Continued)

OTHER PUBLICATIONS

Fangcheng Lü et al., "Optimization Design for Multiple Target Parameters of High Power Medium Frequency Transformer", High Voltage Engineering, Jan. 31, 2017, with English abstract, pp. 210-217, vol. 43, No. 1.

(Continued)

*Primary Examiner* — Crystal L Hammond
*Assistant Examiner* — Nusrat Quddus
(74) *Attorney, Agent, or Firm* — JCIPRNET

(57) ABSTRACT

The disclosure provides a method for improving the efficiency of a micro-inverter, and a dual-active-bridge-type micro-inverter. The method including: performing power modulation mode switching of a dual-active-bridge-type micro-inverter, such that the power is bi-directionally transmitted from a direct-current side to an alternating-current side and from the alternating-current side to the direct-current side, thereby reducing an effective value of a secondary side current of a transformer; and according to the modulation mode switching characteristic of the dual-active-bridge-type micro-inverter within a power frequency period, performing hybrid optimization on the turn ratio of (Continued)

a primary side to a secondary side and a transformer leakage inductance of a high-frequency transformer of the dual-active-bridge-type micro-inverter.

13 Claims, 12 Drawing Sheets

(58) Field of Classification Search
CPC ............ H02M 7/66; H02M 7/68; H02M 7/72; H02M 7/483; H02M 2007/4835; H02M 7/487; H02M 1/08; H02M 1/084; H02M 1/0845; H02M 7/515; H02M 7/525; H02M 7/527; H02M 7/529; H02M 7/539; H02M 3/073; H02M 3/10; H02M 3/135; H02M 3/137; H02M 3/28; H02M 3/315; H02M 3/3155; H02M 3/325; H02M 3/335; H02M 7/10; H02M 7/53; H02M 7/537; H02M 7/5383; H02M 7/538466; H02M 7/53862; H02M 7/5387; H02M 7/53871; H02M 7/53875; H02M 7/79; H02M 3/337; H02M 3/338; H02M 3/3382; H02M 3/3384; H02M 7/538; H02M 7/53806; H02M 7/53832; H02M 7/53835; H02M 7/23; H02M 7/217; H02M 7/21; H02M 7/12; H02M 7/04; H02M 7/00; H01F 29/00; H01F 29/02; H01F 29/025; H01F 29/04; G05F 1/10; G05F 1/12; G05F 1/14; G05F 1/147; G05F 1/153; G05F 1/16; G05F 1/20; G05F 1/22; G05F 1/24; G05F 1/247; G05F 1/253; G05F 1/26; G05F 1/30; H01H 9/0005; H02H 7/055; H02J 3/1878
See application file for complete search history.

(56) References Cited

U.S. PATENT DOCUMENTS 10,545,381 B2 * 1/2020 Shimoshikiryoh .......................... G02F 1/133753
11,689,092 B1 * 6/2023 Nasiri .................. H02M 1/007 363/21.03

FOREIGN PATENT DOCUMENTS

| | | |
|---|---|---|
| CN | 103441677 | 12/2013 |
| CN | 103595287 | 2/2014 |
| CN | 103986331 | 8/2014 |
| CN | 104317979 | 1/2015 |
| CN | 105099200 | 11/2015 |
| CN | 105450031 | 3/2016 |
| CN | 106849668 | 6/2017 |
| CN | 110022054 | 7/2019 |
| CN | 110581003 | 12/2019 |
| CN | 110943606 | 3/2020 |
| CN | 111478572 | 7/2020 |
| CN | 111478600 | 7/2020 |
| CN | 111490683 | 8/2020 |
| CN | 111541378 | 8/2020 |
| CN | 110138225 | 10/2020 |
| CN | 112052562 | 12/2020 |
| CN | 112069655 | 12/2020 |
| CN | 113140399 | 7/2021 |
| CN | 113141119 | 7/2021 |
| CN | 113283073 | 8/2021 |
| CN | 114189159 | 3/2022 |
| CN | 114785180 | 7/2022 |
| CN | 114977872 | 8/2022 |
| DE | 102015205789 | 10/2016 |
| JP | 2002059029 | 2/2002 |
| KR | 20220004356 | 1/2022 |
| WO | 2014192014 | 12/2014 |

OTHER PUBLICATIONS

"International Search Report (Form PCT/ISA/210) of PCT/CN2023/092411," mailed on Jul. 24, 2023, with English translation thereof, pp. 1-6.

* cited by examiner

METHOD FOR IMPROVING EFFICIENCY OF MICRO-INVERTER AND DUAL-ACTIVE-BRIDGE-TYPE MICRO-INVERTER

CROSS-REFERENCE TO RELATED APPLICATION

This application is a 371 of international application of PCT application serial no. PCT/CN2023/092411, filed on May 6, 2023, which claims the priority benefit of China application no. 202210590592.1, filed on May 26, 2022 and China application no. 202210589560.X, filed on May 26, 2022. The entirety of each of the above mentioned patent applications is hereby incorporated by reference herein and made a part of this specification.

TECHNICAL FIELD

The present invention relates to the field of photovoltaic micro-inverter technology, and in particular to a method for improving the efficiency of a micro-inverter and a dual-active-bridge-type micro-inverter.

BACKGROUND

Micro-inverter generally refers to an inverter with a power of less than or equal to 1000 W in a photovoltaic power generation system and having maximum power point tracking capability at the component level. Unlike centralized and string type PV inverter systems, micro-inverters are directly connected to individual PV modules. Its advantage is that it can perform independent MPPT control on each component, which can significantly improve the overall efficiency and at the same time avoid the DC high voltage, poor weak light effect, barrel effect, etc. of the centralized inverter. With the development of micro-inverter technology, the application range of micro-inverters has gradually expanded from PV systems to battery energy storage systems, and micro-inverters have taken a place in household energy storage due to their advantages such as small size and high efficiency.

According to the location and structural characteristics of the DC bus, micro-inverters can be divided into three main categories: DC bus structure, pseudo-DC bus structure and no DC bus structure. Wherein, the micro-inverter with DC bus structure is a two-stage structure, the front stage DC-DC conversion circuit uses fixed duty period modulation and the post stage DC-AC circuit uses SPWM modulation, and the two stages of the circuit are independently decoupled and controlled, but the loss of the post stage DC-AC conversion circuit is higher; the micro-inverter with pseudo-DC bus structure is also a two-stage structure, in which the front stage DC-DC conversion circuit uses SPWM modulation and the post stage DC-AC circuit uses power frequency square wave modulation, the disadvantage is that the control of the front stage DC-DC circuit is more complicated, which is prone to cause the distortion of the AC output current; the micro-inverter with non-DC bus is a single-stage circuit, and uses matrix control, which is more advantageous because of the small number of switching devices used and the high conversion efficiency.

The main problem of micro-inverters at present is how to improve the efficiency of micro-inverters.

SUMMARY

The object of the present invention is to provide a method for improving the efficiency of a micro-inverter and a dual-active-bridge-type micro-inverter to fully or partially solve the problem of how to improve the efficiency of existing micro-inverters.

In order to solve the above technical problems, the present invention provides a method for improving the efficiency of a micro-inverter, comprising:

Performing power modulation mode switching of a dual-active-bridge-type micro-inverter, such that the power is bi-directionally transmitted from a DC side to an AC side and from the AC side to the DC side, thereby reducing an effective value of a secondary side current of a transformer; and According to the modulation mode switching characteristic of the dual-active-bridge-type micro-inverter within a power frequency period, performing hybrid optimization on the turn ratio of a primary side to a secondary side and a transformer leakage inductance of a high-frequency transformer of the dual-active-bridge-type micro-inverter.

Optionally, in the method for improving the efficiency of a micro-inverter, performing power modulation mode switching of a dual-active-bridge-type micro-inverter, such that the power is bi-directionally transmitted from a DC side to an AC side and from the AC side to the DC side, thereby reducing an effective value of a secondary side current of a transformer comprises:

- Determining an internal phase shift angle $D_1$ and an external phase shift angle $D_2$, wherein the internal phase shift angle $D_1$ is an angle between the negative rising edge of the square wave voltage generated by the primary side square wave generating circuit and the positive rising edge of the square wave voltage generated by the primary side square wave generating circuit; the external phase shift angle $D_2$ is an angle between the fundamental wave of the square wave voltage generated by the primary side square wave generating circuit of the transformer and the fundamental wave of the square wave voltage generated by the secondary side square wave generating circuit of the transformer;
- Directly controlling the primary side square wave generating circuit by using the internal phase shift angle $D_1$ to generate a corresponding square wave voltage, controlling the secondary side square wave generating circuit by using the external phase shift angle $D_2$ summed with an output of the current loop closed-loop control by an adder, to generate a corresponding square wave voltage, to realize the given transmission power of the micro-inverter;
- Taking the internal phase shift angle $D_1$ and the external phase shift angle $D_2$ as two control degrees of freedom of the micro-inverter, according to the two control degrees of freedom of the micro-inverter, dividing the modulation mode of transmission power into mode one, mode two and mode three, and according to the instantaneous transmission power of the micro-inverter and the value of the internal phase shift angle $D_1$, switching the micro-inverter between mode three and mode two.

Optionally, in the method for improving the efficiency of a micro-inverter, the range of values of the internal phase shift angle $D_1$ is $0 \leq D_1 \leq 0.5$, and the range of values of the external phase shift angle $D_2$ is $-0.5 \leq D_2 \leq 0.5$;

According to the two control degrees of freedom, dividing the modulation mode of transmission power into mode one, mode two and mode three comprises:

When the external phase shift angle $D_2$ satisfies $(1-D_1)/2<|D_2|\leq 0.5$, the corresponding modulation mode is mode one;

When the external phase shift angle $D_2$ satisfies $D_1/2<|D_2|\leq(1-D_1)/2$ the corresponding modulation mode is mode two;

When the external phase shift angle $D_2$ satisfies $0\leq|D_2|\leq D_1/2$, the corresponding modulation mode is mode three.

Optionally, in the method for improving the efficiency of a micro-inverter, the mode one comprises:

When the transmission power direction is from the DC side to the AC side, the transmission power range corresponding to mode one is $$0 \leq P_1 \leq \frac{1}{8}\frac{nV_{bat}|v_g|}{4f_{sw}L_k},$$

and the maximum transmission power is obtained at $D_1=0.25$ and $D_2=0.375$;

When the transmission power direction is from the AC side to the DC side, the transmission power range corresponding to mode one is $$-\frac{1}{8}\frac{nV_{bat}|v_g|}{4f_{sw}L_k} \leq P_1 \leq 0,$$

and the maximum transmission power is obtained at $D_1=0.25$ and $D_2=-0.375$;

Within the entire power frequency period, the effective value of the secondary side current of the transformer corresponding to mode one is the maximum;

The mode two comprises:

When the transmission power direction is from the DC side to the AC side, the transmission power range corresponding to mode two is $$0 \leq P_2 \leq \frac{1}{4}\frac{nV_{bat}|v_g|}{4f_{sw}L_k},$$

and the maximum transmission power is obtained at $D_1=0$ and $D_2=0.25$;

When the transmission power direction is from the AC side to the DC side, the transmission power range corresponding to mode two is $$-\frac{1}{4}\frac{nV_{bat}|v_g|}{4f_{sw}L_k} \leq P_2 \leq 0,$$

and the maximum transmission power is obtained at $D_1=0$ and $D_2=-0.25$;

Within the overload time period of the power frequency period, the effective value of the secondary side current of the transformer corresponding to mode two is the smallest;

The mode three comprises:

When the transmission power direction is from the DC side to the AC side, the transmission power range corresponding to mode three is $$0 \leq P_3 \leq \frac{1}{8}\frac{nV_{bat}|v_g|}{4f_{sw}L_k},$$

and the maximum transmission power is obtained at $D_1=0.25$ and $D_2=0.125$;

When the transmission power direction is from the AC side to the DC side, the transmission power range corresponding to mode three is $$-\frac{1}{8}\frac{nV_{bat}|v_g|}{4f_{sw}L_k} \leq P_3 \leq 0,$$

and the maximum transmission power is obtained at $D_1=0.25$ and $D_2=-0.125$;

Within the light load time period of the power frequency period, the effective value of the secondary side current of the transformer corresponding to mode three is the smallest;

In the formula, n is the turn ratio of the secondary and primary side of the high-frequency transformer, $V_{bat}$ is the DC side battery voltage, $|v_g|$ is the absolute value of the grid-side voltage, $f_{sw}$ is the frequency of the square wave voltage of the primary and secondary sides, and $L_k$ is the inductance value of leakage inductance of the transformer converted to the secondary side.

Optionally, in the method for improving the efficiency of a micro-inverter, switching the micro-inverter between mode three and mode two according to the instantaneous transmission power of the micro-inverter and the value of the internal phase shift angle $D_1$ comprises:

Within one power frequency period, switching between modulation modes according to the instantaneous transmission power of the micro-inverter and the value of the internal phase shift angle $D_1$ according to the following principles:

When $|M|\leq D_1(1-2D_1)$, the modulation mode is switched to mode three;

When $|M|>D_1(1-2D_1)$, the modulation mode is switched to mode two;

Wherein M is the transmission power ratio of the micro-inverter, defined as $$M = \frac{4f_{sw}L_k}{nV_{bat}}i_{gref}\cdot \mathrm{sgn}(v_g),$$

wherein n is the turn ratio of the secondary side and primary side of the high-frequency transformer, $V_{bat}$ is the DC side battery voltage, $f_{sw}$ is the switching frequency of the micro-inverter, $L_k$ is the inductance value of leakage inductance of the transformer converted to the secondary side, and $i_{gref}$ is the given value of the grid-side current, $\mathrm{sgn}(v_g)$ is the sign function of the grid side voltage.

Optionally, in the method for improving the efficiency of a micro-inverter, further comprising:

Firstly, determining the variation regularity of the internal phase shift angle within the power frequency period, and then determining the variation regularity of the external phase shift angle according to the internal phase shift angle and instantaneous output power; wherein:

The variation regularity of the internal phase shift angle comprises:

$$D_1 = \max\left\{0,\ 0.5 - \frac{I_{m,ref}}{I_{m,N}} \cdot \sin(\theta+\varphi)\right\}$$

In the formula, max { } is the function of taking the maximum value, θ is the phase of the grid voltage, φ is the phase of the given value of the grid-side current, $I_{m,ref}$ is the amplitude of the given value of the grid-side current, and $I_{m,N}$ is the amplitude of the rated current of the grid-side;

The calculation method for the variation regularity of the external phase shift angle, comprising:

When the modulation mode is in mode one, the variation regularity of the external phase shift angle is:

$$D_2 = \left[\frac{1}{2} - \frac{|M|}{2(1-2D_1)}\right] \cdot \mathrm{sgn}(M);$$

When the modulation mode is in mode two, the variation regularity of the external phase shift angle is:

$$D_2 = \frac{1 - \sqrt{1 - 4|M| - 4D_1^2}}{4} \cdot \mathrm{sgn}(M);$$

When the modulation mode is in mode three, the variation regularity of the external phase shift angle is:

$$D_2 = \frac{|M|}{2(1-2D_1)} \cdot \mathrm{sgn}(M);$$

Wherein M is the transmission power ratio of the micro-inverter, defined as $$M = \frac{4 f_{sw} L_k}{n V_{bat}} i_{gref} \cdot \mathrm{sgn}(v_g),$$

wherein n is the turn ratio of the secondary side and primary side of the high-frequency transformer, $V_{bat}$ is the DC side battery voltage, $f_{sw}$ is the switching frequency of the micro-inverter, $L_k$ is the inductance value of leakage inductance of the transformer converted to the secondary side, and $i_{gref}$ is the given value of the grid-side current, $\mathrm{sgn}(v_g)$ is the sign function of the grid side voltage.

Optionally, in the method for improving the efficiency of a micro-inverter, according to the modulation mode switching characteristics of the dual-active-bridge-type micro-inverter within the power frequency period, performing a hybrid optimization of the turn ratio of the primary and secondary side of the high-frequency transformer and transformer leakage inductance of the dual-active-bridge-type micro-inverter comprises:

The turn ratio of the primary and secondary side of the high-frequency transformer is 1:n, and the inductance value of leakage inductance of the transformer converted to the secondary side is $L_k$;

The variable to be optimized n comprises s candidate values, $n=\{n_1, n_2, \ldots, n_j, \ldots, n_s\}$; the variable to be optimized $L_k$ has p candidate values, $L_k=\{L_1, L_2, \ldots, L_i, \ldots, L_p\}$;

Pre-screening the candidate values of the two variables to be optimized, using the pre-screened candidate values $(L_i, n_j)$ as input variables, scanning the candidate value $n_j$ and the candidate value $L_i$, and obtaining the conduction loss of the micro-inverter within the power frequency period corresponding to the candidate values $(L_i, n_j)$;

Repeating the above steps, scanning all candidate values of the variable n to be optimized and the variable $L_k$ to be optimized, the obtained input variable corresponding to the minimum conduction loss of the micro-inverter within the power frequency period is the optimal magnetic element parameter.

Optionally, in the method for improving the efficiency of a micro-inverter, the pre-screening of candidate values of the two variables to be optimized comprises:

If the maximum transmission power $P_{max}(a,b)$ of the micro-inverter corresponding to the candidate values $(L_a, n_b)$ is less than the rated peak transmission power $P_{ac,max}$, taking the next set of candidate values $(L_{a+1}, n_1)$ when b+1>s, otherwise taking the next set of candidate values $(L_a, n_{b+1})$; repeating the process until the maximum transmission power of the micro-inverter corresponding to candidate values is greater than or equal to the rated peak transmission power;

If the maximum transmission power $P_{max}(a,b)$ of the micro-inverter corresponding to the candidate values $(L_a, n_p)$ is greater than or equal to the rated peak transmission power $P_{ac,max}$, then outputting the set of candidate values as input variables;

Wherein the calculation method for the maximum transmission power $P_{max}(a,b)$ of the micro-inverter corresponding to the candidate values $(L_a, n_b)$ comprises:

$$P_{max}(a, b) = \frac{n_b V_{dc} V_m}{16 f_{sw} L_a}$$

In the formula, $n_b$ is the turn ratio of the secondary side and primary side of the high-frequency transformer in the candidate value, $f_{sw}$ is the switching frequency of the micro-inverter, $L_a$ is the inductance value of leakage inductance of the transformer converted to the secondary side, $V_{dc}$ is the DC side bus capacitance voltage, and $V_m$ is the rated voltage amplitude of the power grid.

Optionally, in the method for improving the efficiency of a micro-inverter, scanning the candidate value $n_j$ and the candidate value $L_i$ comprises:

For the input variables $(L_i, n_j)$, determining the modulation mode of the micro-inverter for each switching period within the power frequency period;

For the input variables $(L_i, n_j)$, for each switching period within the power frequency period, calculating the effective value of the secondary side current of the transformer $$i_{s,rms}^{(i,j)}$$

and the effective value of the primary side current of the transformer $$n_j i_{s,rms}^{(i,j)}$$

under the corresponding modulation mode;

Repeating the above modulation mode determination and the effective value calculation process until all switching periods within the power frequency period are traversed;

For the input variables ($L_i$, $n_j$), calculating the conduction loss of the micro-inverter within the power frequency period according to the effective value of the secondary side current of the transformer $$i_{s,rms}^{(i,j)}$$

and the effective value of the primary side current of the transformer $$n_j i_{s,rms}^{(i,j)}$$

for each switching period within the power frequency period, as well as the conduction resistance of the selected primary and secondary switching tubes.

Optionally, in the method for improving the efficiency of a micro-inverter, calculating the effective value of the secondary side current of the transformer $$i_{s,rms}^{(i,j)}$$

and the effective value of the primary side current of the transformer $$i_{p,rms}^{(i,j)}$$

under the corresponding modulation mode, comprising:

The calculating method of the effective value of the secondary side current of the transformer $$i_{s,rms}^{(i,j)},$$

comprising:

$$i_{s,rms}^{(i,j)} = \sqrt{\frac{1}{m}\sum_{r=0}^{m-1}(i_{s,rms,r})^2}$$

Wherein, m is the number of power frequency period segments; $i_{s,rms,r}$ is the effective value of the secondary side current of the transformer within the rth segment of the power frequency period, which is calculated as follows:

$$i_{s,rms,r} = \begin{cases} \text{Mode one: } \frac{\sqrt{3n_j V_{dc}|v_{g,r}|}}{6f_{sw}L_k} \cdot \sqrt{\begin{pmatrix} \left(\frac{4}{m_v}+1\right)D_1^3 + 12D_1D_2^2 - \\ \left(\frac{3}{m_v}+\frac{3}{2}\right)D_1^2 - 12D_1D_2 - \\ 6D_2^2 + 3D_1 + 6D_2 + \\ \left(\frac{1}{4m_v} - \frac{5}{4} + \frac{m_v}{16}\right) \end{pmatrix}} \\ \text{Mode two: } \frac{\sqrt{3n_j V_{dc}|v_{g,r}|}}{6f_{sw}L_k} \cdot \sqrt{\begin{pmatrix} \left(\frac{4}{m_v}-\frac{3}{2}\right)D_1^3 - 8D_2^3 - \\ 6D_2D_1^2 + 6D_1D_2^2 + \\ \left(\frac{3}{2}-\frac{3}{m_v}\right)D_1^2 + 6D_2^2 + \\ \left(\frac{1}{4m_v} - \frac{1}{4} + \frac{m_v}{16}\right) \end{pmatrix}} \\ \text{Mode three: } \frac{\sqrt{3n_j V_{dc}|v_{g,r}|}}{6f_{sw}L_k} \cdot \sqrt{\begin{pmatrix} \left(\frac{4}{m_v}-1\right)D_1^3 - 12D_1D_2^2 + \\ \left(\frac{3}{2}-\frac{3}{m_v}\right)D_1^2 + 6D_2^2 + \\ \left(\frac{1}{4m_v} + \frac{m_v}{16} - \frac{1}{4}\right) \end{pmatrix}} \end{cases}$$

Wherein $f_{sw}$ is the switching frequency of the micro-inverter, $L_k$ is the inductance value of leakage inductance of the transformer converted to the secondary side, $n_j$ is the turn ratio of the secondary side and primary side of the high-frequency transformer, $V_{dc}$ is the DC side bus capacitance voltage, $|v_{g,r}|$ is the power grid voltage at the beginning of the rth segment of the power frequency period, and my is the voltage gain that satisfies $m_v=|v_{g,r}|/(n_jV_{dc})$;

The calculating method of the effective value of the primary side current of the transformer $$i_{p,rms}^{(i,j)},$$

comprising:

$$i_{p,rms}^{(i,j)} = n_j \cdot i_{s,rms}^{(i,j)};$$

Calculating the conduction loss of the micro-inverter within the power frequency period, comprising: calculating the conduction loss of the primary side switching tube of the micro-inverter $P_{loss,pri}$, calculating the conduction loss of the secondary side switching tube of the micro-inverter $P_{loss,sec}$, and calculating the conduction loss of the micro-inverter transformer $P_{loss,tr}$, wherein:

Calculating the conduction loss of the primary side switching tube of the micro-inverter $P_{loss,pri}$ comprises:

$$P_{loss,pri} = 4 \cdot \left[i_{p,rms}^{(i,j)}\right]^2 \cdot R_{ds,on,pri}$$

Wherein $R_{ds,on,pri}$ is the on-resistance of a single primary side switching tube;

Calculating the conduction loss of the secondary side switching tube of the micro-inverter $P_{loss,sec}$ comprises:

$$P_{loss,sec} = 4 \cdot \left[i_{s,rms}^{(i,j)}\right]^2 \cdot R_{ds,on,sec}$$

Wherein $R_{ds,on,sec}$ is the on-resistance of a single secondary side switching tube;

The conduction loss of the micro-inverter transformer $P_{loss,tr}$ comprises:

$$P_{loss,tr} = \left[i_{p,rms}^{(i,j)}\right]^2 \cdot R_{tr,pri} + \left[i_{s,rms}^{(i,j)}\right]^2 \cdot R_{tr,sec}$$

Wherein $R_{tr,pri}$ and $R_{tr,sec}$ are the wire-wound resistors of the primary and secondary sides of the transformer, respectively;

A method of calculating the efficiency η of the micro-inverter under full load within an power frequency periods, comprising:

$$\eta = \frac{P_{ac,N}}{P_{ac,N} + P_{loss,pri} + P_{loss,sec} + P_{loss,tr}}$$

Wherein $P_{ac,N}$ is the rated transmission power of the micro-inverter.

Optionally, in the method for improving the efficiency of a micro-inverter, further comprises: according to the modulation mode switching characteristics of the micro-inverter within an power frequency period, and in combination with the power point defined by the European weighted efficiency, performing a hybrid optimization design of the turn ratio of the primary and secondary side of the high-frequency transformer and transformer leakage inductance of the micro-inverter, so that the European weighted efficiency of the micro-inverter is the highest; wherein the calculation method for European weighted efficiency comprises:

Measuring and calculating the efficiencies of the micro-inverter $\eta=\{\eta_{5\%}, \eta_{10\%}, \eta_{20\%}, \eta_{30\%}, \eta_{50\%}, \eta_{100\%}\}$ corresponding to 5%, 10%, 20%, 30%, 50% and 100% power points, and performing weighted efficiency calculation to obtain the European weighted efficiency;

Wherein the 5%, 10%, 20%, 30%, 50% and 100% power points are the power points defined by European weighted efficiency, and their corresponding weighted coefficients are W={0.03, 0.06, 0.13, 0.10, 0.48, 0.20}, respectively;

Pre-screening the candidate values of the two variables to be optimized, comprising:

Calculating the maximum transmission power $P_{max}$(a,b) of the micro-inverter at the 100% power point corresponding to each set of candidate values ($L_a$, $n_b$);

If the maximum transmission power $P_{max}$(a,b) of the micro-inverter is less than the rated peak transmission power $P_{ac,max}$, taking the next set of candidate values ($L_{a+1}$, $n_1$) when b+1>s, otherwise taking the next set of candidate values ($L_a$, $n_{b+1}$); repeating the process until the maximum transmission power of the micro-inverter at the 100% power point corresponding to candidate values is greater than or equal to the rated peak transmission power;

If the maximum transmission power $P_{max}$(a,b) of the micro-inverter is greater than or equal to the rated peak transmission power $P_{ac,max}$, then outputting the set of candidate values as input variables;

Wherein the calculation method for the maximum transmission power $P_{max}$(a,b) of the micro-inverter at the 100% power point corresponding to the candidate values ($L_a$, $n_b$) comprises:

$$P_{max}(a, b) = \frac{n_b V_{dc} V_m}{16 f_{sw} L_a}$$

In the formula, $n_b$ is the turn ratio of the secondary side and primary side of the high-frequency transformer in the candidate value, $f_{sw}$ is the switching frequency of the micro-inverter, $L_a$ is the inductance value of leakage inductance of the transformer converted to the secondary side, $V_{dc}$ is the DC side bus capacitance voltage, and $V_m$ is the rated voltage amplitude of the power grid.

Scanning the candidate value $n_j$ and the candidate value $L_i$ comprises:

Selecting the working power points of the micro-inverter in sequence from the working power points defined by the European weighted efficiency definition;

For the input variables ($L_i$, $n_j$), in conjunction with the selected working power points, determining the modulation mode of the micro-inverter for each switching period within the power frequency period;

For the input variables ($L_i$, $n_j$), in conjunction with the selected working power points, for each switching period within the power frequency period, calculating the effective value of the secondary side current of the transformer $$i_{s,rms}^{(i,j)}$$

and the effective value of the primary side current of the transformer $$n_j i_{s,rms}^{(i,j)}$$

under the corresponding modulation mode;

Repeating the above modulation mode determination and the current effective value calculation process until all switching periods within the power frequency period are traversed;

For the input variables ($L_i$, $n_j$), in conjunction with the selected working power points, calculating the conduction loss of the micro-inverter and the micro-inverter efficiency within the power frequency period according to the effective value of the secondary side current of the transformer and the effective value of the primary side current of the transformer for each switching period within the power frequency period, as well as the conduction resistance of the selected primary and secondary switching tubes; if the selected working power point is 100% at this time, then calculating the European weighted efficiency corresponding to the input variable ($L_i$, $n_j$) according to the European weighted efficiency calculation method; otherwise, re-select the working power point of the next micro-inverter until the European weighted efficiency corresponding to the input variable ($L_i$, $n_j$) is obtained when the working power point is 100%.

The present invention also provides a dual-active-bridge-type micro-inverter, comprises a dual-active-bridge-type micro-inverter body and a power modulation mode switching system;

An input end of a phase-locked loop segment is connected to the power grid, an output end of the phase-locked loop segment, after combining with the output end of the power grid current given value, is connected to an input end of a current loop segment; the input end of the feed-forward control segment is connected to the DC side battery, the combination end of the phase-locked loop segment with the output end of the power grid current given value, and the power grid, respectively; one output end of the feed-forward control segment is connected to the primary side square wave generating circuit to control the primary side square wave generating circuit to output square wave voltage, and the other output end of the feed-forward control segment, after combining with the output end of the current loop segment, is connected to the secondary side square wave generating circuit, to control the secondary square wave generating circuit to output square wave voltage, thereby realizing a given transmission power;

Defining the angle between the negative rising edge of the square wave voltage generated by the primary side square wave generating circuit and the positive rising edge of the square wave voltage generated by the primary side square wave generating circuit as an internal phase shift angle $D_1$; defining the angle between the fundamental wave of the square wave voltage generated by the primary side square wave generating circuit and the fundamental wave of the square wave voltage generated by the secondary side square wave generating circuit as an external phase shift angle $D_2$; and taking the internal phase shift angle $D_1$ and the external phase shift angle $D_2$ as two control degrees of freedom of the dual-active-bridge-type micro-inverter, according to the two control degrees of freedom, dividing the modulation mode of transmission power of the dual-active-bridge-type micro-inverter into mode one, mode two and mode three, and according to the instantaneous transmission power of the dual-active-bridge-type micro-inverter and the value of the internal phase shift angle $D_1$, switching the micro-inverter between mode three and mode two.

Optionally, in the dual-active-bridge-type micro-inverter, the power modulation mode switching system comprises:

A grid-side current given value calculation module, which passes the power grid voltage $v_g$ of the dual-active-bridge-type micro-inverter through a phase-locked loop segment to obtain the power grid voltage phase angle θ, which combines with the amplitude of the grid-side current given value $I_{m,ref}$ to obtain the grid-side current given value $i_{g,ref}$, wherein the amplitude of the grid-side current given value $I_{m,ref}$ of the dual-active-bridge-type micro-inverter is given by the higher level scheduling;

An internal phase shift angle calculation module, which subtracts the grid-side current given value $i_{g,ref}$ from the grid-side current $i_g$ of the dual-active-bridge-type micro-inverter, to obtain the external phase shift angle variation value $\Delta D_2$ through the current loop segment; and combines the DC side battery voltage $V_{bat}$, the power grid voltage $v_g$ and the grid-side current given value $i_{g,ref}$ to obtain the internal phase shift angle $D_1$ and the calculated value of the external phase shift angle $D_{2,cal}$ through the feed-forward control segment;

An external phase shift angle calculation module, which directly uses the internal phase shift angle $D_1$ to control the primary side square wave generating circuit of the dual-active-bridge-type micro-inverter to output square wave voltage, and adds the calculated value of the external phase shift angle $D_{2,cal}$ and the external phase shift angle variation value $\Delta D_2$ to obtain the external phase shift angle $D_2$, which is used to control the secondary side square wave generating circuit of the dual-active-bridge-type micro-inverter to output square wave voltage, to realize the given the transmission power of the dual-active-bridge-type micro-inverter;

A mode switching module, which takes the internal phase shift angle $D_1$ and the external phase shift angle $D_2$ as two control degrees of freedom of the dual-active-bridge-type micro-inverter, according to the two control degrees of freedom, divides the modulation mode of transmission power into mode one, mode two and mode three, and according to the instantaneous transmission power of the dual-active-bridge-type micro-inverter and the value of the internal phase shift angle $D_1$, switches the dual-active-bridge-type micro-inverter between mode three and mode two.

The present invention also provides a dual-active-bridge-type micro-inverter, implements the method as described above.

The inventors of the present invention have discovered through research that:

Currently, the modulation strategies of DC-free-type micro-inverters can be divided into three kinds, the first kind is to make the micro-inverter work in a single phase shift modulation state, under this modulation strategy, the micro-inverter only has one control degree of freedom, and the effective value of the transformer secondary side current is large, which makes the efficiency lower; the second kind is to make the micro-inverter work in an extended phase shift modulation state and only work in a single modulation mode within the power frequency period, although this method improves the problem of large effective value of current under single phase shift modulation, the effective value of current is still large under light load within the power frequency period and part of the soft switches will be lost; the third kind is to make the micro-inverter work in an extended phase shift state and switch the modulation mode between the two modulation modes within the power frequency period, although this method expands the soft switch range of the micro-inverter to the full range of the power frequency period, however, due to the inappropriate selection of modulation modes in this method, one of the modulation modes has a larger effective value of current, therefore, the overall efficiency of the micro-inverter decreases. Currently, no explanation or report of technology similar to the present invention has been found, and no similar information has been collected domestically or internationally.

In addition, the high-frequency transformer is an important component of the dual-active-bridge-type micro-inverter and also a hub of energy interaction between the primary side circuit and secondary side circuit. The magnetic element parameters in the high-frequency transformer not only affect the transmission power boundary of the micro-inverter, but also affect the effective values of the primary and secondary side currents of the micro-inverter, thereby affect the efficiency of the micro-inverter, therefore, the optimization design of the magnetic element parameters is an important segment of improving the efficiency of the micro-inverter. The current design methods for magnetic element parameters of high-frequency transformer are all for DAB-type DC-DC converters, but not suitable for isolated DC-AC converters such as single-stage half-bridge DAB-type micro-inverters; in addition, the current designs of the transformer magnetic element usually only design for the transformer leakage inductance, while ignoring the fact that both transformer turn ratio and leakage inductance have an effect on transmission power and transformer current. Therefore, there is an urgent need for a parameter hybrid optimization design scheme suitable for isolated DC-AC converters, and which takes into account two magnetic element parameters of transformer turn ratio and leakage inductance comprehensively.

After searching, it was found that: the Chinese invention patent "Control method for current-source-type dual transformer bidirectional DC-DC converter", with the authorization number CN110138225B, obtains the duty ratio of the zero voltage level of the high-voltage side with a given output voltage, to realize the matching of the output side voltage of the transformer; by determining the relationship between the duty ratio of the high voltage level and phase shift angle of the low voltage side, and the duty ratio of the zero voltage level of the high voltage side, and the number of turns of the two transformers, controls the above variables so that the converter operates in a mode of peak current minimization, realizing the optimization of the peak and effective values of the leakage inductance current, and realizing a wide-range soft switching of all switch tubes, so as to improve the conversion efficiency of the converter. The method still suffers from the following technical problems: firstly, the method is only applicable to the optimization control of a current-source-type DC-DC converter, while the dual-active-bridge-type micro-inverter is a voltage-source-type DC-AC converter, so the method is no longer applicable; in addition, the method only improves the efficiency of the converter by optimizing the control of a current-source-type DC-DC converter, but does not optimize the design of the parameters of the high-frequency transformer. Currently, no explanation or report of technology similar to the present invention has been found, and no similar information has been collected domestically or internationally.

Based on the above insights, the present invention provides a method for improving the efficiency of a micro-inverter and a dual-active-bridge-type micro-inverter, a bidirectional dual-active-bridge-type micro-inverter and a power modulation mode switching method and system, realizes a bidirectional power transmission of "transmission power from the DC side to the AC side" and "transmission power from the AC side to the DC side", which can significantly reduce the effective value of the transformer secondary side current, thereby reducing the conduction loss of the converter, and improving the efficiency of the micro-inverter, and thus improving the conversion efficiency of the photovoltaic system.

Furthermore, optimizing the magnetic element parameters of the micro-inverter based on mode switching can make the micro-inverter have the highest full load efficiency under the optimization design of high-frequency transformer magnetic element parameters; at the same time, by the hybrid optimization design of the transformer primary and secondary side turn ratio and the transformer leakage inductance parameters, while the power transmission constraints of the micro-inverter is satisfied, and the transformer primary and secondary side currents under the optimized parameters are reduced, and by comprehensively considering the efficiency of the micro-inverter at six power points, the light load efficiency of the micro-inverter under the optimization design of the high-frequency transformer parameters is also greatly improved, which is conducive to the enhancement of the European weighted efficiency, so that the micro-inverter still has a higher efficiency when the photovoltaic panels are obstructed, the light intensity is insufficient, or the ambient temperature is unsuitable.

DETAILED DESCRIPTION OF EMBODIMENTS

Figure 1:
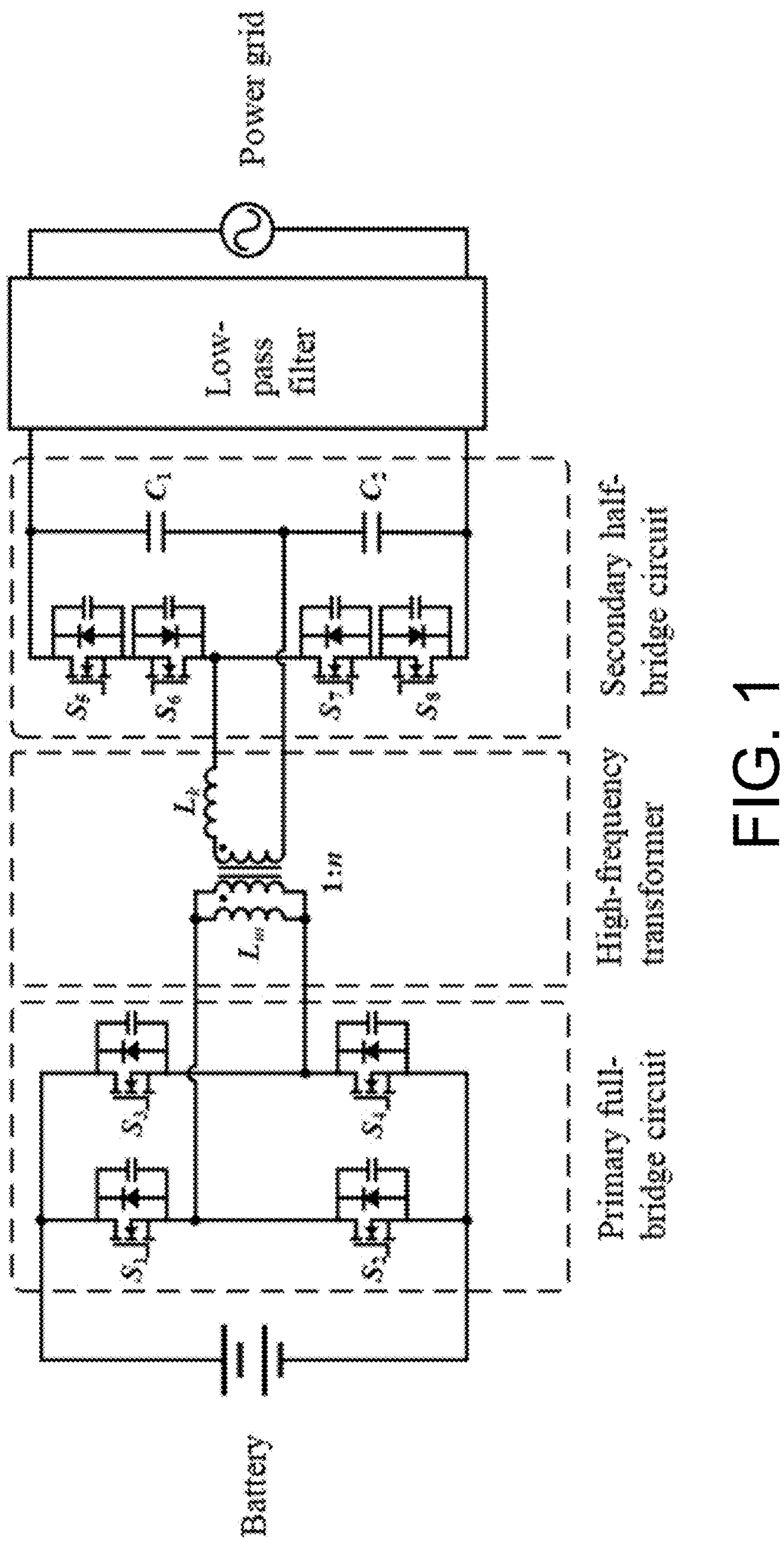
FIG. 1 shows a typical circuit schematic diagram of a dual-active-bridge-type (DAB) micro-inverter.

The present invention will be further described below with reference to the accompanying drawings in conjunction with specific embodiments.

It should be noted that various components in the accompanying drawings may be exaggerated for the purpose of illustrative illustration and are not necessarily in the correct scale. In the accompanying drawings, components that are identical or functionally identical are provided with the same accompanying drawing reference signs.

In the present invention, unless otherwise specified, the expressions "arranged on", "arranged above" and "arranged over" do not exclude the existence of intermediates between the two. In addition, "arranged on or above" only indicates the relative positional relationship between the two components, but under certain circumstances, such as when the product direction is reversed, it can be converted to "arranged under or below", and vice versa.

In the present invention, the embodiments are merely intended to illustrate the scheme of the present invention and should not be construed as limiting.

In the present invention, the quantifiers "a" and "one" do not exclude scenarios with multiple elements, unless otherwise specified.

It should also be noted herein that in embodiments of the present invention, only a portion of the components or assemblies may be shown for the sake of clarity and simplicity, but those ordinary skilled in the art will be able to understand that the required components or assemblies may be added as needed according to specific scenarios in light of the teachings of the present invention. In addition, features in different embodiments of the present invention may be combined with each other unless otherwise indicated. For example, a feature in the second embodiment may be substituted for a corresponding or functionally identical or similar feature in the first embodiment, and the resulting embodiment likewise falls within the scope of the disclosure or the scope of the record of the present application.

It should also be noted that, within the scope of the present invention, the terms "the same", "equal", "equal to", etc. do not mean that the two numerical values are absolutely equal, but rather allow for a certain reasonable error, that is to say, the terms also cover "substantially the same", "substantially equal" and "substantially equal to". By analogy, in the present invention, the terms "perpendicular to", "parallel to", etc., which indicate direction, also cover the meaning of "substantially perpendicular to", "substantially parallel to".

In addition, the numbering of the steps of various methods of the present invention does not limit the order in which the steps of the method are performed. Unless otherwise indicated, the steps of various methods may be performed in a different order.

The method for improving the efficiency of a micro-inverter and a dual-active-bridge-type micro-inverter proposed in the present invention will be further detailed described below in conjunction with the accompanying drawings and specific embodiments. The advantages and features of the present invention will become clearer according to the following description. It should be noted that the accompanying drawings are in a very simplified form and use non-precise proportions, used only for convenience and clarity assisting in the illustration of the purpose of embodiments of the present invention.

The object of the present invention is to provide a method for improving the efficiency of a micro-inverter and a dual-active-bridge-type micro-inverter to fully or partially solve the problem of how to improve the efficiency of existing micro-inverters.

To achieve the above objects, the present invention realizes a given transmission power by providing a bidirectional dual-active-bridge-type micro-inverter and a power modulation mode switching method and system, determining an internal phase shift angle and an external phase shift angle, the internal phase shift angle directly controls the primary side square wave generating circuit to generate a square wave voltage, and the external phase shift angle, after summed with the output of the current loop closed-loop control by the adder, controls the secondary side square wave generating circuit to generate a square wave voltage; according to the two control degrees of freedom of the micro-inverter, the modulation mode of transmission power is divided into mode one, mode two and mode three, and according to the instantaneous transmission power of the micro-inverter and the value of the internal phase shift angle, the micro-inverter is switched between mode three and mode two. The present invention significantly reduces the effective value of the transformer secondary side current and improves the efficiency of the micro-inverter; the power response speed of the micro-inverter can be improved due to the incorporation of feed-forward control; and seamless switching can be realized between various working modes without jumping of the internal phase shift angle and the external phase shift angle during switching.

In addition, through the optimization design method of magnetic element parameters of the micro-inverter based on mode switching control, based on the characteristics of the micro-inverter switching between multiple modulation modes within the power frequency period, the hybrid optimization design is carried out for the two mutually coupled variables of the turn ratio n and leakage inductance $L_k$ of the high-frequency transformer in the micro-inverter, which can satisfy the power transmission constraints while also making the converter conduction loss is minimized under the same transmission power conditions. Through this optimization design method, the conduction loss of the micro-inverter under full load condition can be minimized; through the comprehensive consideration of the conduction loss at different power points, the European weighted efficiency of the micro-inverter can be maximized; through the comprehensive consideration of the effects of the two design variables of the high-frequency transformer turn ratio and leakage inductance on the transmission power and the efficiency of the micro-inverter, the designed parameters are more practical.

An embodiment of the present invention provides a switchable power modulation method for a bidirectional dual-active-bridge-type micro-inverter, which can comprise the following steps:

Determining an internal phase shift angle $D_1$ and an external phase shift angle $D_2$, the internal phase shift angle $D_1$ is an angle between the negative rising edge of the square wave voltage generated by the primary side square wave generating circuit and the positive rising edge of the square wave voltage generated by the primary side square wave generating circuit; the external phase shift angle $D_2$ is an angle between the fundamental wave of the square wave voltage generated by the primary side square wave generating circuit of the transformer and the fundamental wave of the square wave voltage generated by the secondary side square wave generating circuit of the transformer;

Generating a corresponding square wave voltage by directly controlling the primary side square wave generating circuit using the internal phase shift angle $D_1$, and generating a corresponding square wave voltage by controlling the secondary side square wave generating circuit using the external phase shift angle $D_2$ summed with the output of the current loop closed-loop control by the adder, to realize the given transmission power of the micro-inverter;

Taking the internal phase shift angle $D_1$ and the external phase shift angle $D_2$ as two control degrees of freedom of the micro-inverter, according to the two control degrees of freedom of the micro-inverter, dividing the modulation mode of transmission power into mode one, mode two and mode three, and according to the instantaneous transmission power of the micro-inverter and the value of the internal phase shift angle $D_1$, switching the micro-inverter between mode three and mode two.

Wherein:

The range of values of the internal phase shift angle $D_1$ is $0 \leq D_1 \leq 0.5$, and the range of values of the external phase shift angle $D_2$ is $-0.5 \leq D_2 \leq 0.5$. The transmission power can be adjusted by adjusting the internal phase shift angle and the external phase shift angle.

According to the two control degrees of freedom of the micro-inverter, the modulation mode of transmission power is divided into mode one, mode two and mode three, that is, the modulation mode is divided based on the range of values of the internal and external phase shift angles; the principle of its division comprises:

When the external phase shift angle $D_2$ satisfies $(1-D_1)/2<|D_2| \leq 0.5$, the corresponding modulation mode is mode one;

When the external phase shift angle $D_2$ satisfies $D_1/2<|D_2| \leq (1-D_1)/2$, the corresponding modulation mode is mode two;

When the external phase shift angle $D_2$ satisfies $0 \leq |D_2| \leq D_1/2$, the corresponding modulation mode is mode three.

Furthermore, the three modulation modes correspond to different power transmission ranges. When the direction of the transmission power is from the DC side to the AC side, the range of the transmission power and the internal phase shift angle and the external phase shift angle corresponding to the maximum power transmission in various modulation modes are as follows, respectively:

The transmission power range corresponding to mode one is $$0 \leq P_1 \leq \frac{1}{8}\frac{nV_{bat}|v_g|}{4f_{sw}L_k},$$

and the maximum transmission power is obtained at $D_1=0.25$ and $D_2=0.375$; the transmission power range corresponding to mode two is $$0 \leq P_2 \leq \frac{1}{4}\frac{nV_{bat}|v_g|}{4f_wL_k},$$

and the maximum transmission power is obtained at $D_1=0$ and $D_2=0.25$; the transmission power range corresponding to mode three is $$0 \leq P_3 \leq \frac{1}{8}\frac{nV_{bat}|v_g|}{4f_{sw}L_k},$$

and the maximum transmission power is obtained at $D_1=0.25$ and $D_2=0.125$.

When the direction of the transmission power is from the AC side to the DC side, the range of the transmission power and the internal phase shift angle and the external phase shift angle corresponding to the maximum power transmission in various modulation modes are as follows, respectively:

The transmission power range corresponding to mode one is $$-\frac{1}{8}\frac{nV_{bat}|v_g|}{4f_{sw}L_k} \leq P_1 \leq 0,$$

and the maximum transmission power is obtained at $D_1=0.25$ and $D_2=-0.375$; the transmission power range corresponding to mode two is $$-\frac{1}{4}\frac{nV_{bat}|v_g|}{4f_{sw}L_k} \leq P_2 \leq 0,$$

and the maximum transmission power is obtained at $D_1=0$ and $D_2=-0.25$; the transmission power range corresponding to mode three is $$-\frac{1}{8}\frac{nV_{bat}|v_g|}{4f_{sw}L_k} \leq P_3 \leq 0,$$

and the maximum transmission power is obtained at $D_1=0.25$ and $D_2=-0.125$.

In the above power transmission range expression, n is the turn ratio of the secondary and primary side of the high-frequency transformer, $V_{bat}$ is the DC side battery voltage, $|v_g|$ is the absolute value of the grid-side voltage, $f_{sw}$ is the switching frequency of the micro-inverter, and $L_k$ is the inductance value of leakage inductance of the transformer converted to the secondary side.

Furthermore, the effective value of the secondary side current of the transformer corresponding to various modulation modes is different. Wherein within the entire power frequency period, the effective value of the secondary side current of the transformer corresponding to mode one is the maximum; within the light load time period of the power frequency period, the effective value of the secondary side current of the transformer corresponding to mode three is the smallest; within the overload time period of the power frequency period, the effective value of the secondary side current of the transformer corresponding to mode two is the smallest.

Within one power frequency period, the micro-inverter switches different modulation modes according to the instantaneous transmission power of and the value of the internal phase shift angle; the modulation modes are switched based on the following principles:

When $|M| \leq D_1(1-2D_1)$, the modulation mode is switched to mode three;

When $|M|>D_1(1-2D_1)$, the modulation mode is switched to mode two;

In the above expression, M is the transmission power ratio of the micro-inverter, and defined as $$M = \frac{4f_{sw}L_k}{nV_{bat}} i_{gref} \cdot \mathrm{sgn}(v_g),$$

wherein n is the turn ratio of the secondary side and primary side of the high-frequency transformer, $V_{bat}$ is the DC side battery voltage, $f_{sw}$ is the switching frequency of the micro-inverter, $L_k$ is the inductance value of leakage inductance of the transformer converted to the secondary side, and $i_{gref}$ is the given value of the grid-side current, $sgn(v_g)$ is the sign function of the grid side voltage. In a preferred embodiment, the internal phase shift angle $D_1$ and the external phase shift angle $D_2$ are determined using a feed-forward control method, firstly, the variation regularity of the internal phase shift angle within the power frequency period is determined, and then the variation regularity of the external phase shift angle according to the internal phase shift angle and instantaneous output power is determined; finally, the internal phase shift angle obtained is used for the phase shift control directly (i.e. to control the corresponding square wave voltage generated by the primary edge square wave generator circuit), the obtained external phase shift angle, after summed with the output of the current loop closed-loop control by the adder, is used for phase shift control (i.e. to control the corresponding square wave voltage generated by the secondary side square wave generating circuit);

Wherein:

The variation regularity of the internal phase shift angle is determined by three factors, the first is the phase of the given value of the grid-side current, the second is to minimize the secondary side current of the transformer as much as possible, and the third is the phase of the power grid voltage;

Specifically, the variation regularity of the internal phase shift angle is:

$$D_1 = \max\left\{0,\ 0.5 - \frac{I_{m,ref}}{I_{m,N}} \cdot \sin(\theta + \varphi)\right\}$$

Wherein max { } is the function of taking the maximum value, $\theta$ is the phase of the grid voltage, $\varphi$ is the phase of the given value of the grid-side current, $I_{m,ref}$ is the amplitude of the given value of the grid-side current, and $I_{m,N}$ is the amplitude of the rated current of the grid-side.

The variation of the external phase shift angle is calculated based on the internal phase shift angle and the instantaneous output power of the micro-inverter, the specific calculation principles are:

When the modulation mode is in mode one, the variation regularity of the external phase shift angle is:

$$D_2 = \left[\frac{1}{2} - \frac{|M|}{2(1 - 2D_1)}\right] \cdot \mathrm{sgn}(M);$$

When the modulation mode is in mode two, the variation regularity of the external phase shift angle is:

$$D_2 = \frac{1 - \sqrt{1 - 4|M| - 4D_1^2}}{4} \cdot \mathrm{sgn}(M);$$

Wherein M is the transmission power ratio of the micro-inverter, and defined as $$M = \frac{4 f_{sw} L_k}{n V_{bat}} i_{gref} \cdot \mathrm{sgn}(v_g),$$

wherein n is the turn ratio of the secondary side and primary side of the high-frequency transformer, $V_{bat}$ is the DC side battery voltage, $f_{sw}$ is the switching frequency of the micro-inverter, $L_k$ is the inductance value of leakage inductance of the transformer converted to the secondary side, and $i_{gref}$ is the given value of the grid-side current, $sgn(v_g)$ is the sign function of the grid side voltage.

Figure 9:
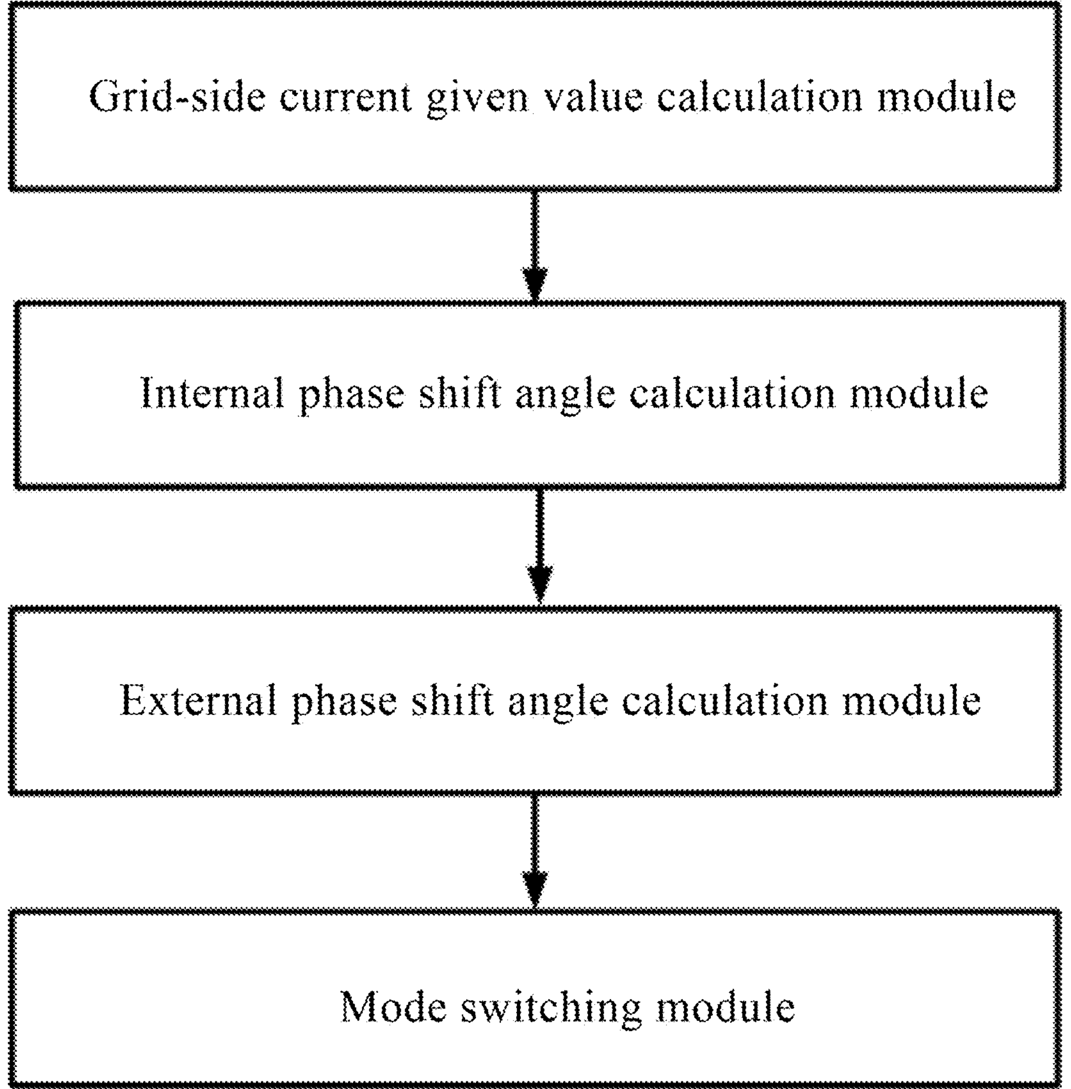
FIG. 9 shows a schematic diagram of the constituent modules of a power modulation mode switching system of a bidirectional dual-active-bridge-type micro-inverter in an embodiment of the present invention.

As shown in FIG. 9, another embodiment of the present invention provides a power modulation mode switching system of a bidirectional dual-active-bridge-type micro-inverter, comprising:

A grid-side current given value calculation module, which passes the power grid voltage $v_g$ of the dual-active-bridge-type micro-inverter through a phase-locked loop module to obtain the power grid voltage phase angle $\theta$, and combines with the amplitude $I_{m,ref}$ of the grid-side current given value to obtain the grid-side current given value $i_{g,ref}$, wherein the amplitude $I_{m,ref}$ of the grid-side current given value of the dual-active-bridge-type micro-inverter is given by the higher level scheduling;

An internal phase shift angle calculation module, which subtracts the grid-side current given value $i_{g,ref}$ from the grid-side current $i_g$ of the dual-active-bridge-type micro-inverter, and then obtains the external phase shift angle variation value $\Delta D_2$ through the current loop segment; and combines the DC side battery voltage $V_{bat}$, the power grid voltage $v_g$ and the grid-side current given value $i_{g,ref}$, and then obtains the internal phase shift angle $D_1$ and the calculated value of the external phase shift angle $D_{2,cal}$ through the feed-forward control segment;

An external phase shift angle calculation module, which directly uses the internal phase shift angle $D_1$ to control the primary side square wave generating circuit of the dual-active-bridge-type micro-inverter to output square wave voltage, and adds the calculated value of the external phase shift angle $D_{2,cal}$ and the external phase shift angle variation value $\Delta D_2$ to obtain the external phase shift angle $D_2$, which is used to control the secondary side square wave generating circuit of the dual-active-bridge-type micro-inverter to output square wave voltage, to realize the given the transmission power of the dual-active-bridge-type micro-inverter;

A mode switching module, which takes the internal phase shift angle $D_1$ and the external phase shift angle $D_2$ as two control degrees of freedom of the dual-active-bridge-type micro-inverter, according to the two control degrees of freedom, the modulation mode of transmission power of the dual-active-bridge-type micro-inverter is divided into mode one, mode two and mode three, and according to the instantaneous transmission power of the dual-active-bridge-type micro-inverter and the value of the internal phase shift angle $D_1$, switches the micro-inverter between mode three and mode two.

It should be noted that the steps in the method provided by the present invention can be realized by using corresponding modules in the system provided in this embodiment, etc., and those skilled in the art can realize the composition of the system with reference to the technical solution of the method, i.e., the embodiments in the method can be understood as preferred embodiments for constructing the system, and which will not be repeated herein.

Figure 7:
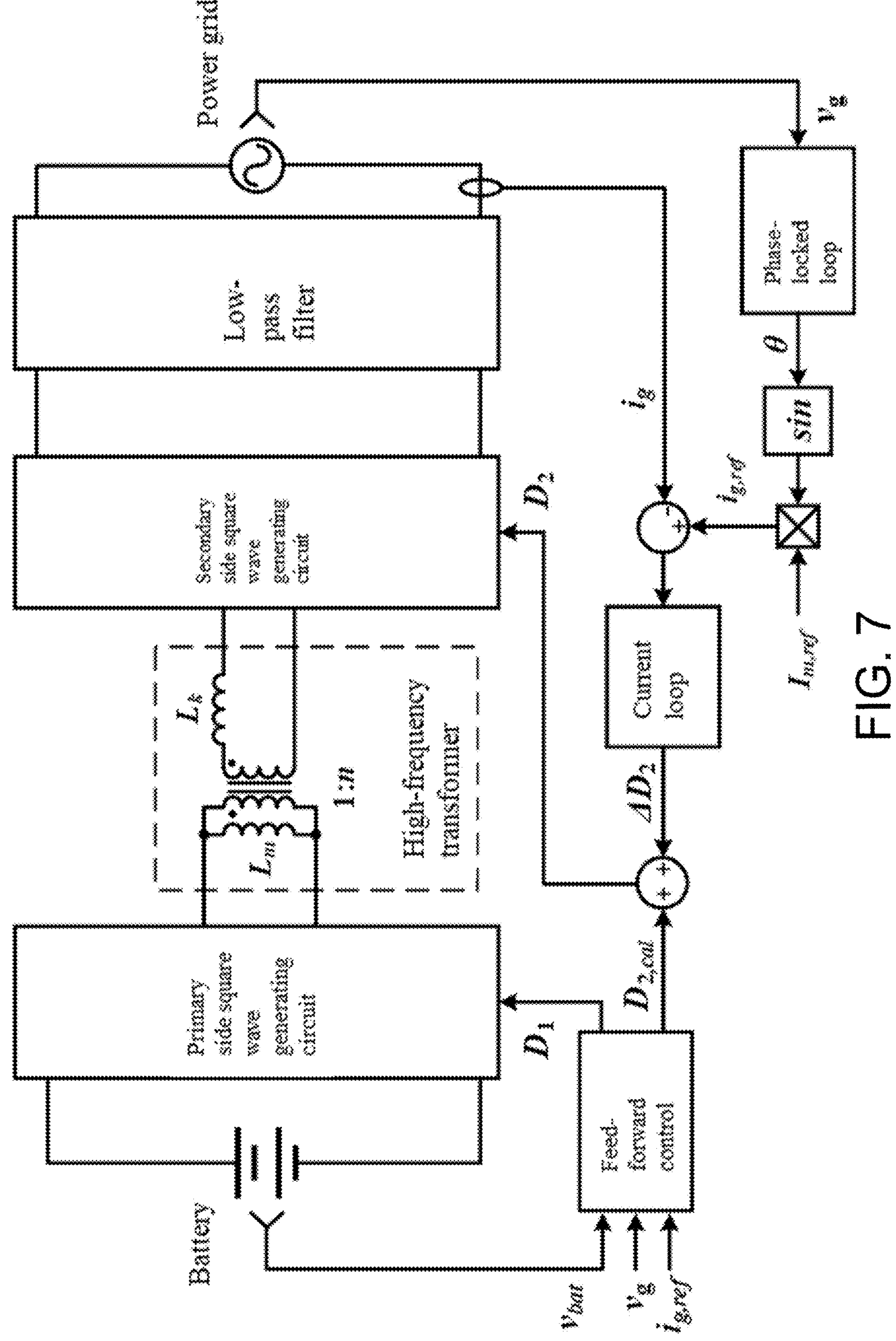
FIG. 7 shows an overall control block diagram of a dual-active-bridge-type micro-inverter based on a transmission power modulation mode switching strategy in a preferred embodiment of the present invention.

The functional realization of a power modulation mode switching system for a bidirectional dual-active-bridge-type micro-inverter provided in this embodiment can be shown with reference to FIG. 7.

An embodiment of the present invention provides a bidirectional dual-active-bridge-type micro-inverter based on a power modulation mode switching strategy. The micro-inverter uses the power modulation mode switching method of any one of the above embodiments, to divide the modulation mode of transmission power of the micro-inverter into mode one, mode two and mode three; and according to the instantaneous transmission power of the micro-inverter to cause the micro-inverter to perform a modulation mode switching between modes three and mode two.

It should be noted that the bidirectional dual-active-bridge-type micro-inverter provided in the present embodiment can utilize the power modulation mode switching method provided in the above described embodiment of the present invention to realize the division and switching of power modulation modes, and those skilled in the art can realize the micro-inverter of the present embodiment with reference to the transmission power modulation mode switching method provided in the above described embodiment of the present invention, i.e., the embodiment in the transmission power modulation mode switching method can be understood as a preferred embodiment for realizing the micro-inverter, and which will not be repeated herein.

An embodiment of the present invention also provides a bidirectional dual-active-bridge-type micro-inverter based on a power modulation mode switching strategy, which may comprise a dual-active-bridge-type micro-inverter body and a power modulation mode switching system of any one of the above embodiments, wherein an input end of a phase-locked loop segment is connected to the power grid, an output end of the phase-locked loop segment, after combining with the output end of the power grid current given value, is connected to an input end of a current loop segment; the input end of the feed-forward control segment is connected to the DC side battery, the combination end of the phase-locked loop segment with the output end of the power grid current given value, and the power grid, respectively; one output end of the feed-forward control segment is connected to the primary side square wave generating circuit to control the primary side square wave generating circuit to output square wave voltage, and the other output end of the feed-forward control segment is connected to the secondary side square wave generating circuit after combining with the output end of the current loop segment, to control the secondary square wave generating circuit to output square wave voltage, thereby realize a given transmission power;

The angle between the negative rising edge of the square wave voltage generated by the primary side square wave generating circuit and the positive rising edge of the square wave voltage generated by the primary side square wave generating circuit is defined as an internal phase shift angle $D_1$; the angle between the fundamental wave of the square wave voltage generated by the primary side square wave generating circuit and the fundamental wave of the square wave voltage generated by the secondary side square wave generating circuit is defined as an external phase shift angle $D_2$; and the internal phase shift angle $D_1$ and the external phase shift angle $D_2$ are used as two control degrees of freedom of the dual-active-bridge-type micro-inverter; according to the two control degrees of freedom, the modulation mode of transmission power of the dual-active-bridge-type micro-inverter is divided into mode one, mode two and mode three; and according to the instantaneous transmission power of the dual-active-bridge-type micro-inverter and the value of the internal phase shift angle $D_1$, the dual-active-bridge-type micro-inverter is switched between mode three and mode two.

It should be noted that the micro-inverter provided in the present embodiment can utilize a transmittable power modulation mode switching system provided in the above described embodiment of the present invention to realize the division and switching of transmission power modulation modes, and those skilled in the art can realize the micro-inverter of the present embodiment with reference to the transmission power modulation mode switching system provided in the above described embodiment of the present invention, i.e., the embodiment in the transmission power modulation mode switching system can be understood as preferred embodiments for realizing the micro-inverter, and which will not be repeated herein.

The dual-active-bridge-type micro-inverter based on a transmission power modulation mode switching strategy is provided in this embodiment, the structure of which is shown in FIG. 7.

The technical scheme provided by the above embodiments of the present invention will be further described below in conjunction with the accompanying drawings of the specific application embodiments.

Figure 2:
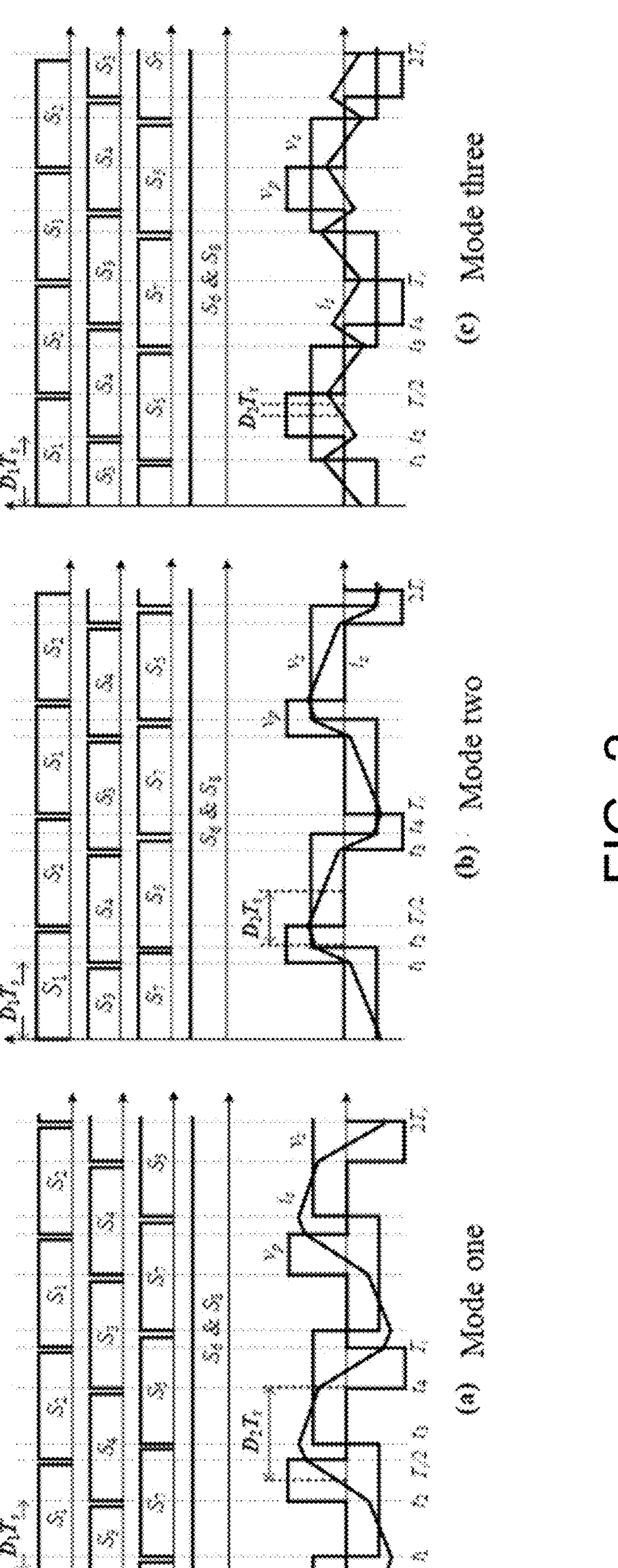
FIG. 2 shows the drive signals of switch tubes S1~S8 under three modulation modes in a dual-active-bridge-type micro-inverter based on a transmission power modulation mode switching strategy, and the wave forms schematic diagrams of transformer primary side voltage, transformer secondary side voltage, and transformer secondary current, in a preferred embodiment of the present invention, when the direction of the transmission power is from the DC side to the AC side and the voltage on the grid-side is positive.

FIG. 1 shows a circuit schematic diagram of a single-stage half-bridge dual-active-bridge-type (DAB) micro-inverter. With reference to FIG. 1, the micro-inverter circuit mainly consists of a DC-side battery, a primary side full-bridge circuit, a high-frequency transformer, a secondary side half-bridge circuit, and a grid-side low-pass wave filter. The primary side full-bridge circuit contains switch tubes S1~S4, and the secondary side half-bridge circuit contains switch tubes S5~S8 and thin film capacitors C1/C2; turns ratio of the primary side to the secondary side of the high-frequency transformer is 1:n, and the excitation inductor converted to the primary side is $L_m$, and the transformer leakage inductor converted to the secondary side is $L_k$. Wherein the DC side battery is connected to the DC port at the input end of the primary side full-bridge circuit, and the AC side output end of the primary side full-bridge circuit is connected to the primary side of the high-frequency transformer, the secondary side of the high-frequency transformer is connected to the AC port of the secondary side half-bridge circuit, the DC port of the secondary side half-bridge circuit is connected to the grid-side low-pass wave filter, and the grid-side low-pass wave filter is directly connected to the AC power grid; in the primary side full-bridge circuit, the source of switch tube S1 is connected to the drain of switch tube S2, and is connected to the positive of the primary side port of the high-frequency transformer; the source of switch tube S3 is connected to the drain of switch tube S4, and is connected to the negative pole of the primary side port of the high-frequency transformer; the drain of switch tube S1 is connected to the drain of switch tube S3, and is connected to the positive pole of the DC side bus capacitor; the source of switch tube S2 is connected to the source of switch tube S4, and is connected to the negative pole of the DC side bus capacitor; in the secondary side square wave generating circuit, the drain of switch tube S5 is connected to the positive pole of the thin film capacitor C1, and the source of switch tube S5 is connected to the source of switch tube S6, the drain of switch tube S6 is connected to the drain of switch tube S7 and is connected to the positive pole of the secondary side port of the transformer, the source of switch tube S7 is connected to the source of switch tube S8, the drain of switch tube S8 is connected to the negative pole of the thin film capacitor C2, the negative pole of the thin film capacitor C1 is connected to the positive pole of the thin film capacitor C2 and is connected to the negative pole of the secondary side port of the transformer;

FIG. 2 shows the driving waveforms of switch tubes S1~S8 and the voltage and current waveforms of the primary and secondary sides of the transformer of three modulation modes in a preferred embodiment of the present invention. With reference to FIG. 2, the basic working mode of the micro-inverter is as follows: switch tubes S1 and S2 complementary conduct at high frequencies, while switch tubes S3 and S4 complementary conduct at high frequencies. When the grid-side voltage is positive, switch tubes S6 and S8 are normally on, and switch tubes S5 and S7 complementary conduct at high frequencies; when the grid-side voltage is negative, switch tubes S5 and S7 are normally on, and switch tubes S6 and S8 complementary conduct at high frequencies.

With reference to FIG. 2, the micro-inverter based on the mode switching optimization modulation strategy in a preferred embodiment of the present invention has two control degrees of freedom, which are the internal phase shift angle $D_1$ of the primary side circuit and the external phase shift angle $D_2$ of the primary and secondary side circuits respectively, wherein the internal phase shift angle is defined as the angle between the negative rising edge of the primary side square wave voltage and the positive rising edge of the primary side square wave voltage, which is also the angle between the drive pulses of the switch tube S4 and the drive pulses of the switch tube S1; and the external phase shift angle is defined as the angle between the fundamental wave of the transformer primary side square wave voltage and the fundamental wave of the transformer secondary side square wave voltage. The range of values of the internal phase shift angle $D_1$ is $0 \le D_1 \le 0.5$, and the range of values of the external phase-shift angle $D_2$ is $-0.5 \le D_2 \le 0.5$, and the adjustment of the output power can be realized by adjusting the internal phase shift angle and the external phase shift angle.

Figure 3:
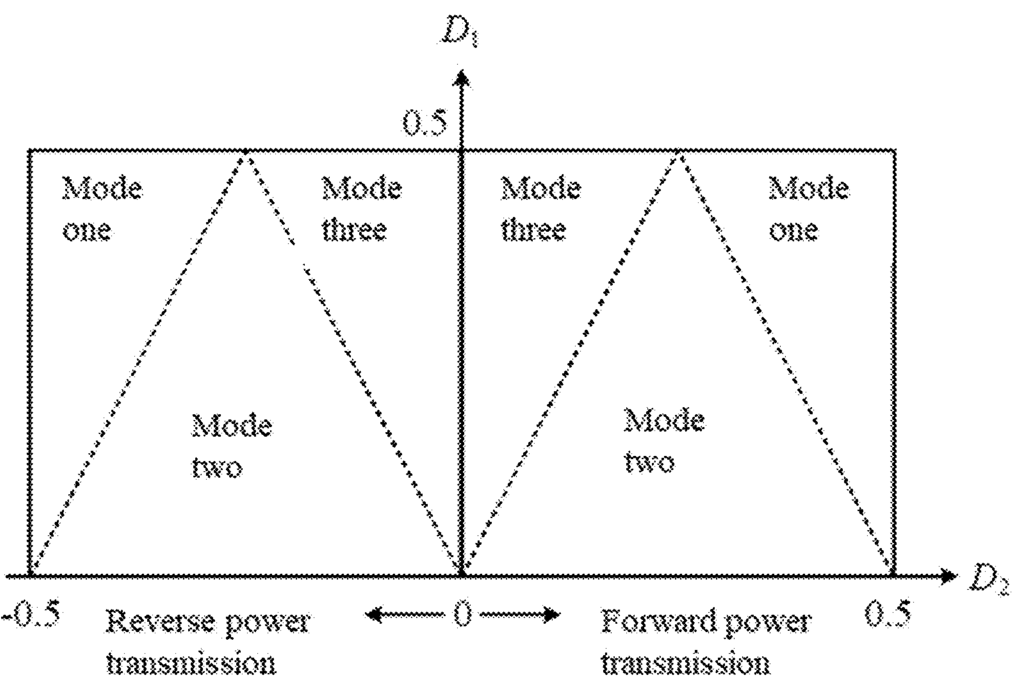
FIG. 3 shows a schematic diagram of the range of internal phase shift angles and external phase shift angles corresponding to the three modulation modes in a preferred embodiment of the present invention.

FIG. 3 shows a schematic diagram of the range of internal phase shift angles and external phase shift angles corresponding to the three modulation modes in a preferred embodiment of the present invention. With reference to FIG. 3, when the range of values of the inner phase shift angle $D_1$ and the outer phase shift angle $D_2$ change, the modulation modes are switched between mode one, mode two and mode three.

Specifically, the above three modulation modes can be divided according to the following principles:

When the power transmission direction is from the DC side to the AC side, if the internal phase shift angle $D_1$ and the external phase shift angle $D_2$ satisfy $0 \le D_1 \le 0.5$ and $(1-D_1)/2 < D_2 \le 0.5$, the corresponding modulation mode is mode one; if the internal phase shift angle $D_1$ and the external phase shift angle $D_2$ satisfy $0 \le D_1 \le 0.5$ and $D_1/2 < D_2 \le (1-D_1)/2$, the corresponding modulation mode is mode two; if the internal phase shift angle $D_1$ and the external phase shift angle $D_2$ satisfy $0 \le D_1 \le 0.5$ and $0 \le D_2 \le D_1/2$, the corresponding modulation mode is mode three;

When the power transmission direction is from the AC side to the DC side, if the internal phase shift angle $D_1$ and the external phase shift angle $D_2$ satisfy $0 \le D_1 \le 0.5$ and $-0.5 < D_2 \le -(1-D_1)/2$, the corresponding modulation mode is mode one; if the internal phase shift angle $D_1$ and the external phase shift angle $D_2$ satisfy $0 \le D_1 \le 0.5$ and $-(1-D_1)/2 < D_2 \le -D_1/2$, the corresponding modulation mode is mode two; if the internal phase shift angle $D_1$ and the external phase shift angle $D_2$ satisfy $0 \le D_1 \le 0.5$ and $D_1/2 \le D_2 \le 0$, the corresponding modulation mode is mode three.

Figure 4:
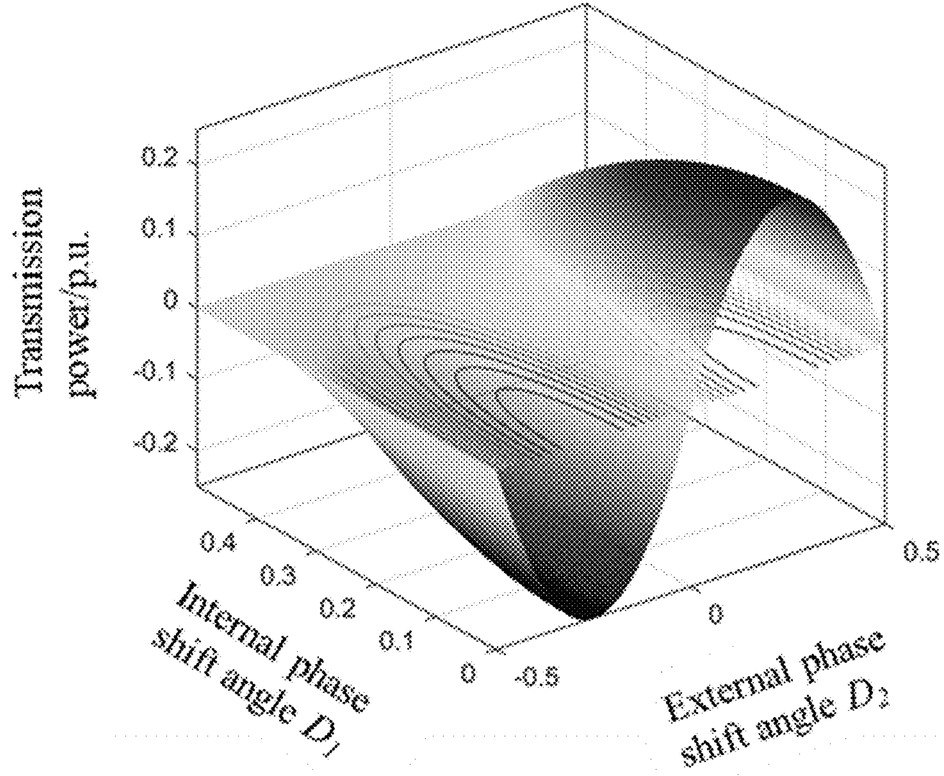
FIG. 4 shows a schematic diagram of the variation of the micro-inverter transmission power with the internal phase shift angles and external phase shift angles under three modulation modes in a preferred embodiment of the present invention.

Furthermore, the three modulation modes described above correspond to different power transmission ranges. FIG. 4 shows a schematic diagram of the variation of the micro-inverter transmission power with the internal phase shift angles and external phase shift angles under three modulation modes in a preferred embodiment of the present invention, and the specific range of the transmission power and the values of the corresponding internal/external phase shift angles at the point of the maximum power under various modulation modes can be referred to as shown in Table 1, wherein n is the turn ratio of the secondary and primary side of the high-frequency transformer, $V_{bat}$ is the DC side battery voltage, $|v_g|$ is the absolute value of the grid-side voltage, $f_{sw}$ is the switching frequency of the micro-inverter, and $L_k$ is the inductance value of leakage inductance of the transformer converted to the secondary side.

TABLE 1

| Modulation mode | Power flow direction | Transmission power range | $D_1$ and $D_2$ at the maximum power point |
|---|---|---|---|
| Model one | From DC side to AC side | $0 \leqslant P_1 \leqslant \frac{1}{8}\frac{nV_{bat}\lvert v_g\rvert}{4f_{sw}L_k}$ | $D_1 = 0.25$, $D_2 = 0.375$ |
| | From AC side to DC side | $-\frac{1}{8}\frac{nV_{bat}\lvert v_g\rvert}{4f_{sw}L_k} \leqslant P_1 \leqslant 0$ | $D_1 = 0.25$, $D_2 = -0.375$ |
| Model two | From DC side to AC side | $0 \leqslant P_2 \leqslant \frac{1}{4}\frac{nV_{bat}\lvert v_g\rvert}{4f_{sw}L_k}$ | $D_1 = 0$, $D_2 = 0.25$ |
| | From AC side to DC side | $-\frac{1}{4}\frac{nV_{bat}\lvert v_g\rvert}{4f_{sw}L_k} \leqslant P_2 \leqslant 0$ | $D_1 = 0$, $D_2 = -0.25$ |
| Model three | From DC side to AC side | $0 \leqslant P_3 \leqslant \frac{1}{8}\frac{nV_{bat}\lvert v_g\rvert}{4f_{sw}L_k}$ | $D_1 = 0.25$, $D_2 = 0.125$ |
| | From AC side to DC side | $-\frac{1}{8}\frac{nV_{bat}\lvert v_g\rvert}{4f_{sw}L_k} \leqslant P_3 \leqslant 0$ | $D_1 = 0.25$, $D_2 = -0.125$ |

Figure 5:
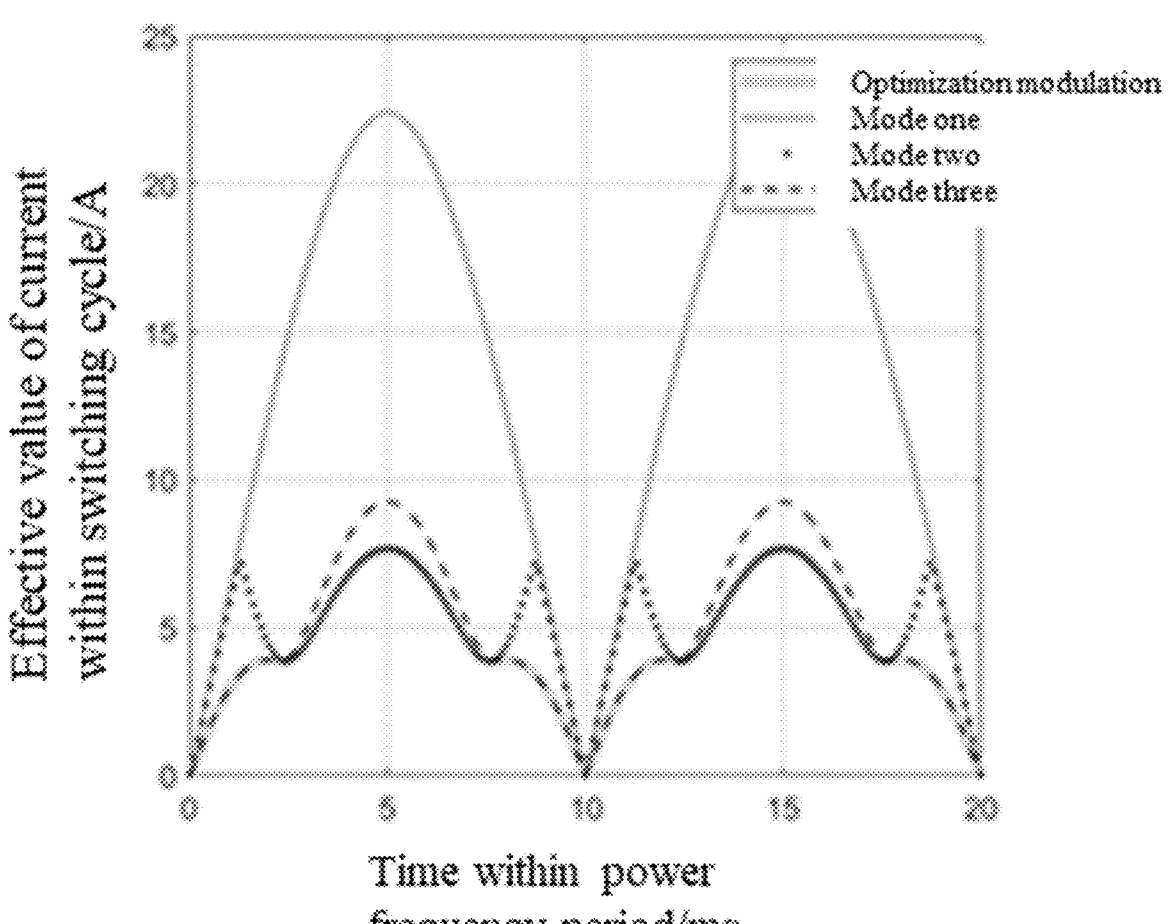
FIG. 5 shows a schematic diagram of the variation of the effective value of the transformer secondary side current within a switching period with time under three modulation modes, within a range of power frequency period in a preferred embodiment of the present invention.

FIG. 5 shows a schematic diagram of the variation of the effective value of the transformer secondary side current within a switching period corresponding to three modulation modes with time in a preferred embodiment of the present invention. With reference to FIG. 5, within an power frequency period, the effective value of the secondary side current of the transformer corresponding to mode one is always the maximum; within the light load time period, the effective value of the secondary side current of the transformer corresponding to mode three is the smallest; within the overload time period, the effective value of the secondary side current of the transformer corresponding to mode two is the smallest. From this, it can be obtained that the optimization modulation mode is such that the modulation mode is switched to mode three within the light load time period in the power frequency period, and the modulation mode is switched to mode two within the overload load time period in the power frequency period.

Figure 6:
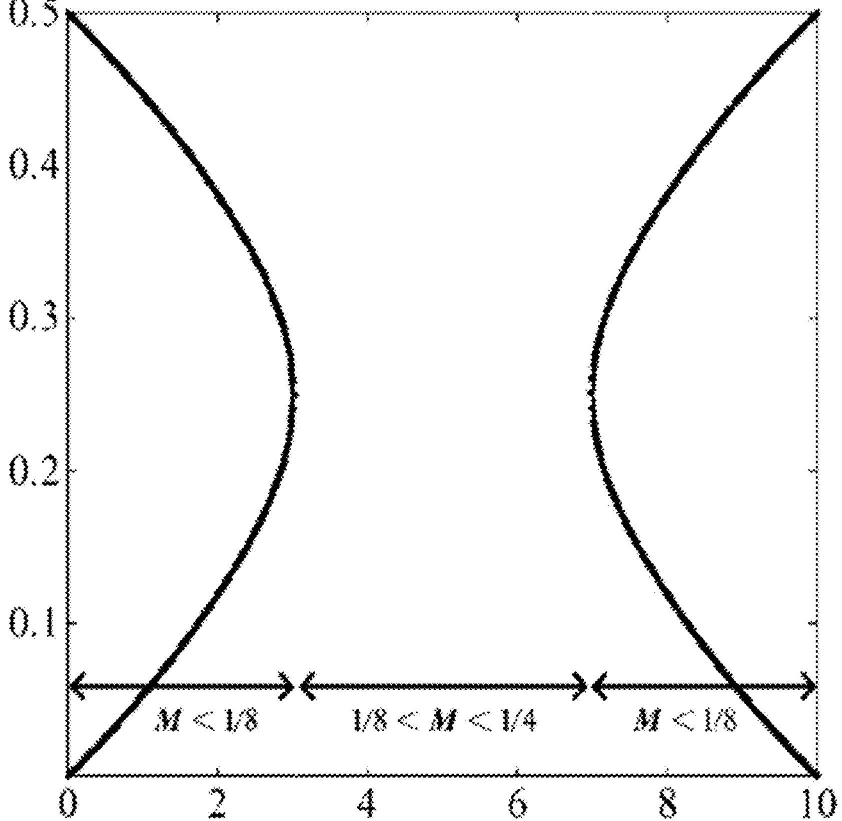
FIG. 6 shows a schematic diagram of the boundaries of mode two and mode three in a preferred embodiment of the present invention.

Furthermore, the mode switching principles of the above embodiment are related to the instantaneous transmission power magnitude and the value of the internal shift phase angle, the specific implementation manner is as follows:

As shown in FIG. 6, when $|M| \le D_1(1-2D_1)$, the modulation mode is switched to mode three;

As shown in FIG. 6, when $|M|>D_1(1-2D_1)$, the modulation mode is switched to mode two;

In the above expression, M is the transmission power ratio of the micro-inverter, defined as $$M = \frac{4f_{sw}L_k}{nV_{bat}} i_{gref} \cdot \mathrm{sgn}(v_g),$$

wherein n is the turn ratio of the secondary side and primary side of the high-frequency transformer, $V_{bat}$ is the DC side battery voltage, $f_{sw}$ is the switching frequency of the micro-inverter, $L_k$ is the inductance value of leakage inductance of the transformer converted to the secondary side, and $\mathrm{sgn}(v_g)$ is the sign function of the grid-side voltage.

Furthermore, when switching modes, the internal phase shift angle $D_1$ varies continuously at the switching boundary, on this premise, the external phase shift angle $D_2$ also varies continuously, seamless switching can be realized between various working modes, and no jumping of the internal phase shift angle and the external phase shift angle occurs when switching.

FIG. 7 shows an overall control block diagram of a dual-active-bridge-type micro-inverter based on a transmission power modulation mode switching strategy in a preferred embodiment of the present invention. With reference to FIG. 7, the lower half thereof is a transmission power modulation mode switching system, where a phase-locked loop segment, a current loop segment and a feed-forward control segment +are provided. The modulation mode switching system receives the amplitude instruction $I_m$ of the given value of the grid-side current from the higher-level dispatch; the modulation mode switching system samples the grid-side voltage $v_g$ and generates the grid-side voltage phase θ through the phase-locked loop segment; θ, after sine transformation is multiplied with $I_m$ to obtain the grid-side current given value $i_{g,ref}$, which is then subtracted from the actual grid-side current sampling value $i_g$, and then an external phase shift angle adjusting value $\Delta D_2$ is obtained through the current loop segment; the modulation mode switching system samples the DC port battery voltage $V_{bat}$ and the grid-side voltage $v_g$, and combines with the given value of grid-side current $i_{g,ref}$ to obtain the internal phase shift angle $D_1$ and the calculated value of the external phase shift angle $D_{2,cal}$ through the feed-forward control segment; the internal phase shift angle $D_1$ is used directly to control the primary side square wave generating circuit to generate the corresponding square wave voltage, and the calculated value of the external phase shift angle $D_{2,cal}$, after summing with the external phase shift angle adjusting value $\Delta D_2$, is used to control the secondary side square wave generating circuit to generate the corresponding square wave voltage, so that the single-stage half-bridge DAB-type micro-inverter outputs a given power.

Figure 8:
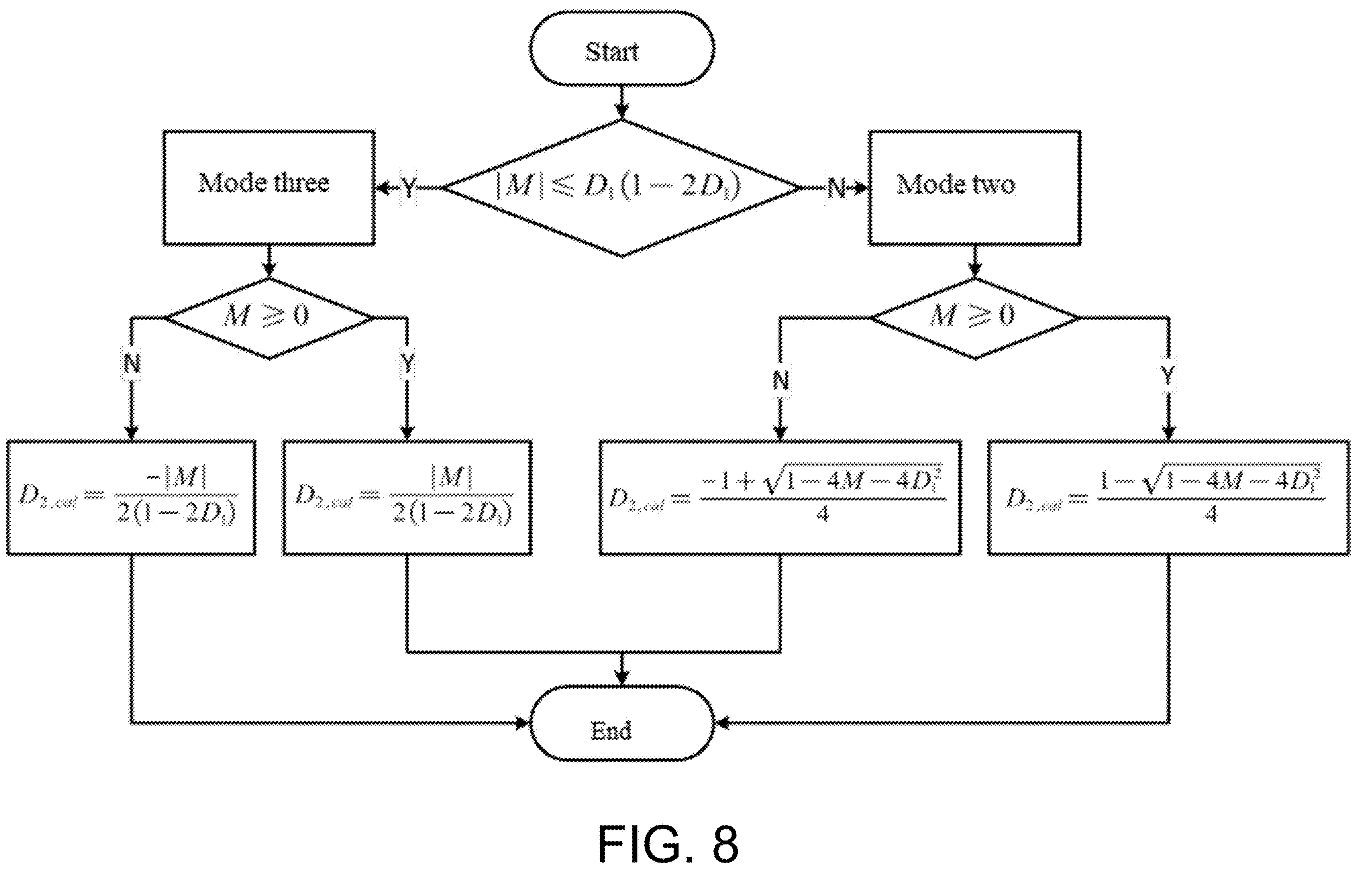
FIG. 8 shows a process schematic diagram of the feed-forward control method in a preferred embodiment of the present invention.

Furthermore, the feed-forward control segment described above is used to determine the internal phase shift angle $D_1$ and the external phase shift angle $D_2$, the specific implementation manner is as follows:

Firstly, determine the variation regularity of the internal phase shift angle $D_1$ within the power frequency period, the variation regularity of the internal phase shift angle is determined by three factors: the first is the phase of the given value of the grid-side current, the second is to minimize the secondary side current of the transformer as much as possible, and the third is to broaden the soft switching range within the power frequency period as much as possible;

Secondly, the calculated value of the external phase shift angle $D_{2,cal}$ is determined according to the internal phase shift angle $D_1$ and the instantaneous output power, as shown in FIG. 8, and the variation of the calculated value of the external phase shift angle is calculated based on the internal phase shift angle and the instantaneous output power of the micro-inverter, the specific calculation principle is as follows:

When the modulation mode is in mode one, the calculated value of the external phase shift angle is $$D_{2,cal} = \left[\frac{1}{2} - \frac{|M|}{2(1-2D_1)}\right] \cdot \mathrm{sgn}(M);$$

When the modulation mode is in mode two, the calculated value of the external phase shift angle is $$D_{2,cal} = \frac{1-\sqrt{1-4|M|-4D_1^2}}{4} \cdot \mathrm{sgn}(M).$$

Of course, the specific circuit of the above embodiment is only a preferred embodiment of an implementation of the present invention and is not intended to limit the present invention, and in other embodiments, can be other forms of circuits realizing the same function.

A micro-inverter and its switchable transmission power modulation method are provided by the above embodiments of the present invention. The modulation strategy of mode switching is based on two control degrees of freedom of the internal phase shift angle and the external phase shift angle in the micro-inverter, to divide the working modes of the micro-inverter into mode one, mode two and mode three, so as to achieve the minimum effective value of the inductance current by switching the working modes within the power frequency period, and to realize the soft switching within the full power frequency period. Using feed-forward control segment, determine the internal phase shift angle and the external phase shift angle: determine the variation regularity of the internal phase shift angle within the power frequency period according to the phase of the given value of the grid-side current, and then determine the external phase shift angle according to the internal phase shift angle and instantaneous output power; the internal phase shift angle obtained is used for the phase shift control directly, and the external phase shift angle obtained, after summed with the output of the current loop closed-loop control by the adder, is used for the phase shift control. A micro-inverter and its switchable transmission power modulation method provided by the above embodiment of the present invention significantly reduces the effective value of the inductance current of the micro-inverter, thereby reducing the conduction loss when the converter works; the feed-forward control manner can improve the response speed of the micro-inverter to power fluctuations.

A dual-active-bridge-type micro-inverter and a transmission power modulation mode switching method and system provided by the above embodiments of the present invention can significantly reduce the effective value of the secondary side current of the micro-inverter transformer compared to micro-inverters of other architectures, thereby reducing the conduction loss of the converter; and also have a soft switching range. When the internal phase shift angle is reasonably designed, the micro-inverter can realize soft switching within the range of the full power frequency period, thus reducing the converter switching loss. Compared with the existing schemes, the efficiency of the micro-inverter can be improved, especially at light loads. It can also improve the power response speed of the micro-inverter and weaken the influence of the nonlinearity of the circuit model on the closed-loop control, thus reducing the difficulty of the closed-loop design.

According to another aspect of the present invention, a power modulation mode switching system for a bidirectional dual-active-bridge-type micro-inverter is provided, comprising:

A grid-side current given value calculation module, which passes the power grid voltage $v_g$ of the dual-active-bridge-type micro-inverter through a phase-locked loop segment to obtain the power grid voltage phase angle θ, and combines with the amplitude $I_{m,ref}$ of the grid-side current given value to obtain the grid-side current given value $i_{g,ref}$, wherein the amplitude $I_{m,ref}$ of the grid-side current given value of the dual-active-bridge-type micro-inverter is given by the higher level scheduling;

An internal phase shift angle calculation module, which subtracts the grid-side current given value $i_{g,ref}$ from the grid-side current $i_g$ of the dual-active-bridge-type micro-inverter to obtain the external phase shift angle variation value $\Delta D_2$ through the current loop segment; and combines the DC side battery voltage $V_{bat}$, the power grid voltage $v_g$ and the grid-side current given value $i_{g,ref}$ to obtain the internal phase shift angle $D_1$ and the calculated value of the external phase shift angle $D_{2,cal}$ through the feed-forward control segment;

An external phase shift angle calculation module, which uses the internal phase shift angle $D_1$ directly to control the primary side square wave generating circuit of the dual-active-bridge-type micro-inverter to output square wave voltage, and adds the calculated value $D_{2,cal}$ of the external phase shift angle and the external phase shift angle variation value $\Delta D_2$ to obtain the external phase shift angle $D_2$, which is used to control the secondary side square wave generating circuit of the dual-active-bridge-type micro-inverter to output square wave voltage, to realize the given the transmission power of the dual-active-bridge-type micro-inverter;

A mode switching module, which uses the internal phase shift angle $D_1$ and the external phase shift angle $D_2$ as two control degrees of freedom of the dual-active-bridge-type micro-inverter, divides the modulation mode of transmission power into mode one, mode two and mode three according to the two control degrees of freedom, and switches the dual-active-bridge-type micro-inverter between mode three and mode two according to the instantaneous transmission power of the dual-active-bridge-type micro-inverter and the value of the internal phase shift angle $D_1$.

According to a third aspect of the present invention, there is provided a bidirectional dual-active-bridge-type micro-inverter based on a power modulation mode switching strategy, using any one of the power modulation mode switching methods described above, dividing all the modulation mode of transmission power into mode one, mode two and mode three; and performing modulation mode switching between mode three and mode two according to the instantaneous transmission power of the micro-inverter to cause the micro-inverter.

According to a fourth aspect of the present invention, there is provided a bidirectional dual-active-bridge-type micro-inverter based on a power modulation mode switching strategy, which comprises the dual-active-bridge-type micro-inverter body and the power modulation mode switching system described above, wherein, an input end of a phase-locked loop segment is connected to the power grid, an output end of the phase-locked loop segment, after combining with the output end of the power grid current given value, is connected to an input end of a current loop segment; the input end of the feed-forward control segment is connected to the DC side battery, the combination end of the phase-locked loop segment with the output end of the power grid current given value, and the power grid, respectively; one output end of the feed-forward control segment is connected to the primary side square wave generating circuit to control the primary side square wave generating circuit to output square wave voltage; and the other output end of the feed-forward control segment, after combining with the output end of the current loop segment, is connected to the secondary side square wave generating circuit, to control the secondary square wave generating circuit to output square wave voltage, thereby realizing a given transmission power;

Define the angle between the negative rising edge of the square wave voltage generated by the primary side square wave generating circuit and the positive rising edge of the square wave voltage generated by the primary side square wave generating circuit as an internal phase shift angle $D_1$; define the angle between the fundamental wave of the square wave voltage generated by the primary side square wave generating circuit and the fundamental wave of the square wave voltage generated by the secondary side square wave generating circuit as an external phase shift angle $D_2$; and take the internal phase shift angle $D_1$ and the external phase shift angle $D_2$ as two control degrees of freedom of the dual-active-bridge-type micro-inverter, according to the two control degrees of freedom, divide the modulation mode of transmission power into mode one, mode two and mode three, and according to the instantaneous transmission power of the micro-inverter and the value of the internal phase shift angle $D_1$, switch the dual-active-bridge-type micro-inverter between mode three and mode two.

The present invention also provides a hybrid optimization design method of magnetic element parameters of a micro-inverter based on mode switching, which carries out a hybrid optimization design of the turn ratio of the primary and secondary side of the high-frequency transformer and leakage inductance of the transformer according to the working characteristics of the micro-inverter switching between multiple modulation modes within the power frequency period, so that the efficiency in a full load condition is maximum.

Furthermore, hybrid optimization design method of magnetic element parameters of a micro-inverter based on mode switching provided by this embodiment can comprises the following steps:

The turn ratio of the primary and secondary side of the high-frequency transformer is 1:n, and the value of leakage inductance of the transformer converted to the secondary side is $L_k$;

The variable to be optimized n comprises s candidate values, $n=\{n_1, n_2, \ldots, n_j, \ldots, n_s\}$; the variable to be optimized $L_k$ has p candidate values, $L_k=\{L_1, L_2, \ldots, L_i, \ldots, L_p\}$;

Pre-screen the candidate values of the two variables to be optimized, use the pre-screened candidate values $(L_i, n_j)$ as input variables, scan the candidate value $n_j$ and the candidate value $L_i$, and obtain the conduction loss of the micro-inverter within the power frequency period corresponding to the candidate values $(L_i, n_j)$;

Repeat the above steps, scan all candidate values of the variable n to be optimized and the variable $L_k$ to be optimized, and the obtained the input variable corresponding to the minimum conduction loss of the micro-inverter within the power frequency period is the optimal magnetic element parameter.

In a preferred embodiment, the pre-screening candidate values of the two variables to be optimized comprising:

If the maximum transmission power $P_{max}(a,b)$ of the micro-inverter corresponding to the candidate values $(L_a, n_b)$ is less than the rated peak transmission power $P_{ac,max}$, take the next set of candidate values $(L_{a+1}, n_1)$ when b+1>s, otherwise take the next set of candidate values $(L_a, n_{b+1})$; repeat the process until the maximum transmission power of the micro-inverter corresponding to candidate values is greater than or equal to the rated peak transmission power;

If the maximum transmission power $P_{max}(a,b)$ of the micro-inverter corresponding to the candidate values $(L_a, n_b)$ is greater than or equal to the rated peak transmission power $P_{ac,max}$, then output the set of candidate values as input variables;

Wherein the maximum transmission power $P_{max}(a,b)$ of the micro-inverter corresponding to the candidate values $(L_a, n_b)$ is calculated by the following manner:

$$P_{max}(a, b) = \frac{n_b V_{dc} V_m}{16 f_{sw} L_a}$$

In the formula, $n_b$ is the turn ratio of the secondary side and primary side of the high-frequency transformer in the candidate value, $f_{sw}$ is the switching frequency of the micro-inverter, $L_a$ is the inductance value of leakage inductance of the transformer converted to the secondary side, $V_{dc}$ is the DC side bus capacitance voltage, and $V_m$ is the rated voltage amplitude of the power grid.

In a preferred embodiment, the scanning the candidate value $n_j$ and the candidate value $L_i$ comprises:

For the input variables $(L_i, n_j)$, determining the modulation mode of the micro-inverter for each switching period within the power frequency period;

For the input variables $(L_i, n_j)$, for each switching period within the power frequency period, calculating the effective value of the secondary side current of the transformer $$i_{s,rms}^{(i,j)}$$

and the effective value of the primary side current of the transformer $$n_j i_{s,rms}^{(i,j)}$$

under the corresponding modulation mode;

Repeating the above modulation mode determination and the effective value calculation process until all switching periods within the power frequency period are traversed;

For the input variables $(L_i, n_j)$, calculating the conduction loss of the micro-inverter within the power frequency period according to the effective value of the secondary side current of the transformer $$i_{s,rms}^{(i,j)}$$

and the effective value of the primary side current of the transformer $$n_j i_{s,rms}^{(i,j)}$$

for each switching period within the power frequency period, as well as the conduction resistance of the selected primary and secondary switching tubes.

In a preferred embodiment, there are three modulation modes of the micro-inverter, which are divided according to the range of values of the internal phase shift angle $D_1$ and the external phase shift angle $D_2$ of the micro-inverter; wherein:

The internal phase shift angle $D_1$ is defined as the angle between the negative rising edge of the primary side square wave voltage of the transformer and the positive rising edge of the primary side square wave voltage of the transformer, $0 \le D_1 \le 0.5$;

The external phase shift angle $D_2$ is defined as the angle between the fundamental wave of the transformer primary side square wave voltage and the fundamental wave of the transformer secondary side square wave voltage, $-0.5 \le D_2 \le 0.5$;

When the external phase shift angle $D_2$ satisfies $(1-D_1)/2 < D_2 \le 0.5$ or $-0.5 < D_2 \le -(1-D_1)/2$, the positive electrical level part of the primary side square wave voltage completely coincides with the negative electrical level part of the secondary side square wave voltage, the corresponding modulation mode is mode one, at this time, the transformer current is close to a sine wave, and the effective value of transformer current is maximum, but the zero voltage soft switching of the primary and secondary side switching tubes is the easiest to achieve;

When the external phase shift angle $D_2$ satisfies $D_1/2 < D_2 \le (1-D_1)/2$ or $-(1-D_1)/2 < D_2 \le -D_1/2$, a part of the positive electrical level of the primary side voltage coincides with the positive electrical level of the secondary side voltage, the other part coincides with the negative electrical level of the secondary side voltage, the corresponding modulation mode is mode two, at this time, the transformer current is close to a trapezoidal wave, the effective value of transformer current is moderate, and the zero voltage soft switching of the primary and secondary side switching tubes is relatively easier to achieve;

When the external phase shift angle $D_2$ satisfies $0 \le D_2 \le D_1/2$ or $-D_1/2 \le D_2 \le 0$, the positive electrical level part of the primary side voltage completely coincides with the positive electrical level part of the secondary side voltage, the corresponding modulation mode is mode three, at this time, the transformer current is close to a triangular wave, among the three modulation modes, mode three has the smallest effective current of the transformer, but the zero voltage soft switching of the primary and secondary side switching tubes is the most difficult to achieve.

Furthermore, for the input variables ($L_i$, $n_j$), in each switching period within an power frequency period, determine the modulation mode of the micro-inverter, comprising: if $|M| \le D_1(1-2D_1)$, then the modulation mode corresponds to mode three; if $|M| > D_1(1-2D_1)$, then the modulation mode corresponds to mode two; in the formula, $D_1$ is the internal shift phase angle, M is the transmission power ratio of the micro-inverter, defined as $$M = \frac{4 f_{sw} L_k}{n V_{dc}} i_{gref} \cdot \operatorname{sgn}(v_g),$$

wherein n is the turn ratio of the secondary side and primary side of the high-frequency transformer, $f_{sw}$ is the switching frequency of the micro-inverter, $L_k$ is the inductance value of leakage inductance of the transformer converted to the secondary side, $\operatorname{sgn}(v_g)$ is the sign function of the grid side voltage, $V_{dc}$ is the DC side bus capacitance voltage, and $i_{gref}$ is the given value of the grid-connection current.

In a preferred embodiment, calculating the effective value of the secondary side current of the transformer $$i_{s,rms}^{(i,j)}$$

and the effective value of the primary side current of the transformer $$i_{p,rms}^{(i,j)}$$

under the corresponding modulation mode, comprising:

The effective value of the secondary side current of the transformer is calculated as follows:

$$i_{s,rms}^{(i,j)} = \sqrt{\frac{1}{m} \sum_{r=0}^{m-1} (i_{s,rms,r})^2}$$

Wherein, m is the number of power frequency period segments; $i_{s,rms,r}$ is the effective value of the secondary side current of the transformer within the rth segment of the power frequency period, which is calculated as follows:

$$i_{s,rms,r} = \begin{cases} \text{Mode one: } \dfrac{\sqrt{3 n_j V_{dc} |v_{g,r}|}}{6 f_{sw} L_k} \cdot \sqrt{\begin{pmatrix} \left(\frac{4}{m_v} + 1\right) D_1^3 + 12 D_1 D_2^2 - \\ \left(\frac{3}{m_v} + \frac{3}{2}\right) D_1^2 - 12 D_1 D_2 - 6 D_2^2 + \\ 3 D_1 + 6 D_2 + \left(\frac{1}{4 m_v} - \frac{5}{4} + \frac{m_v}{16}\right) \end{pmatrix}} \\ \text{Mode two: } \dfrac{\sqrt{3 n_j V_{dc} |v_{g,r}|}}{6 f_{sw} L_k} \cdot \sqrt{\begin{pmatrix} \left(\frac{4}{m_v} - \frac{3}{2}\right) D_1^3 - 8 D_2^3 - 6 D_2 D_1^2 + \\ 6 D_1 D_2^2 + \left(\frac{3}{2} - \frac{3}{m_v}\right) D_1^2 + 6 D_2^2 + \\ \left(\frac{1}{4 m_v} - \frac{1}{4} + \frac{m_v}{16}\right) \end{pmatrix}} \\ \text{Mode three: } \dfrac{\sqrt{3 n_j V_{dc} |v_{g,r}|}}{6 f_{sw} L_k} \cdot \sqrt{\begin{pmatrix} \left(\frac{4}{m_v} - 1\right) D_1^3 - 12 D_1 D_2^2 + \\ \left(\frac{3}{2} - \frac{3}{m_v}\right) D_1^2 + 6 D_2^2 + \\ \left(\frac{1}{4 m_v} + \frac{m_v}{16} - \frac{1}{4}\right) \end{pmatrix}} \end{cases}$$

Wherein $f_{sw}$ is the switching frequency of the micro-inverter, $L_k$ is the inductance value of leakage inductance of the transformer converted to the secondary side, $n_j$ is the turn ratio of the secondary side and primary side of the high-frequency transformer, $V_{dc}$ is the DC side bus capacitance voltage, $|v_{g,r}|$ is the power grid voltage at the beginning of the rth segment of the power frequency period, and my is the voltage gain that satisfies $m_v = |v_{g,r}|/(n_j V_{dc})$.

The effective value of the primary side current of the transformer is calculated as follows:

$$i_{p,rms}^{(i,j)} = n_j \cdot i_{s,rms}^{(i,j)};$$

The calculating the conduction loss of the micro-inverter within the power frequency period comprises the conduction loss of the primary side switching tube of the micro-inverter $P_{loss,pri}$, the conduction loss of the secondary side switching tube of the micro-inverter $P_{loss,sec}$, and the conduction loss of the micro-inverter transformer $P_{loss,tr}$, wherein:

The conduction loss of the primary side switching tube of the micro-inverter $P_{loss,pri}$ is calculated as follows:

$$P_{loss,pri} = 4 \cdot \left[i_{p,rms}^{(i,j)}\right]^2 \cdot R_{ds,on,pri}$$

Wherein $R_{ds,on,pri}$ is the on-resistance of a single primary side switching tube.

The conduction loss of the secondary side switching tube of the micro-inverter $P_{loss,sec}$ is calculated as follows:

$$P_{loss,sec} = 4 \cdot \left[i_{s,rms}^{(i,j)}\right]^2 \cdot R_{ds,on,sec}$$

Wherein $R_{ds,on,sec}$ is the on-resistance of a single secondary side switching tube.

The conduction loss of the micro-inverter transformer $P_{loss,tr}$ is calculated as follows:

$$P_{loss,tr}=\left[i_{p,rms}^{(i,j)}\right]^2\cdot R_{tr,pri}+\left[i_{s,rms}^{(i,j)}\right]^2\cdot R_{tr,sec}$$

Wherein $R_{tr,pri}$ and $R_{tr,sec}$ are the wire-wound resistors of the primary and secondary sides of the transformer, respectively.

The efficiency η of the micro-inverter within the power frequency period is calculated as follows:

$$\eta=\frac{P_{ac,N}}{P_{ac,N}+P_{loss,pri}+P_{loss,sec}+P_{loss,tr}}$$

Wherein $P_{ac,N}$ is the rated transmission power of the micro-inverter.

The method provided in this embodiment of the present invention is a method of hybrid optimization design for magnetic element parameters of a dual-active-bridge-type micro-inverter based on mode switching and maximizing the full load efficiency. In this method, according to the working characteristics of the micro-inverter switching between multiple modulation modes within the power frequency period, a hybrid optimization design of the primary and secondary side turn ratio of the high-frequency transformer and the transformer leakage inductance is carried out, so as to maximizing the efficiency in the full load case. Wherein:

The turn ratio of the primary and secondary side of the high-frequency transformer of the dual-active-bridge-type micro-inverter is 1:n, and the value of leakage inductance of the transformer converted to the secondary side of the transformer is $L_k$, and the transformer does not open air gap, thereby making the transformer excitation inductance $L_m$ as large as possible.

There are three modulation modes of the micro-inverter, which are divided according to the range of values of the internal phase shift angle $D_1$ and the external phase shift angle $D_2$ of the micro-inverter; wherein the internal phase shift angle is defined as the angle between the negative rising edge of the primary side square wave voltage and the positive rising edge of the primary side square wave voltage; and the external phase shift angle is defined as the angle between the fundamental wave of the transformer primary side square wave voltage and the fundamental wave of the transformer secondary side square wave voltage. When the external phase shift angle $D_2$ satisfies $(1-D_1)/2<D_2\leq 0.5$ or $-0.5<D_2\leq-(1-D_1)/2$, the corresponding modulation mode is mode one; when the external phase shift angle $D_2$ satisfies $D_1/2<D_2\leq(1-D_1)/2$ or $-(1-D_1)/2<D_2\leq-D_1/2$, the corresponding modulation mode is mode two; when the external phase shift angle $D_2$ satisfies $0\leq D_2$ D/2 or $-D/2\leq D_2\leq 0$, the corresponding modulation mode is mode three.

Wherein mode one is defined as the modulation mode in which the positive electrical level part of the primary side square wave voltage completely coincides with the negative electrical level part of the secondary side square wave voltage, at this time, the transformer current is close to a sine wave, and the effective value of transformer current is maximum, but the zero voltage soft switching of the primary and secondary side switching tubes is the easiest to achieve; mode two is defined as the modulation mode in which a part of the positive electrical level of the primary side voltage coincides with the positive electrical level of the secondary side voltage, the other part coincides with the negative electrical level of the secondary side voltage, at this time, the transformer current is close to a trapezoidal wave, the effective value of transformer current is moderate, and the zero voltage soft switching of the primary and secondary side switching tubes is relatively easier to achieve; mode three is defined as the modulation mode in which the positive electrical level part of the primary side voltage completely coincides with the positive electrical level part of the secondary side voltage, at this time, the transformer current is close to a triangular wave, among the three modulation modes, mode three has the smallest effective current of the transformer, but the zero voltage soft switching of the primary and secondary side switching tubes is the most difficult to achieve.

The variable to be optimized n comprises s candidate values, $n=\{n_1, n_2, \ldots, n_j, \ldots, n_s\}$; the variable to be optimized $L_k$ has p candidate values, $L_k=\{L_1, L_2, \ldots, L_i, \ldots, L_p\}$.

The method provided in this embodiment of the present invention mainly consists of two segments, namely a pre-screening segment and a formal optimization design segment.

Wherein the principle of pre-screening is:

If the maximum transmission power $P_{max}(i,j)$ of the micro-inverter corresponding to the candidate variable group $(L_a, n_b)$ is less than the rated peak transmission power $P_{ac,max}$, then take the next set of candidate variable group $(L_{a+1}, n_1)$ or $(L_a, n_{b+1})$, and repeat the judgment process;

If the maximum transmission power $P_{max}(i,j)$ of the micro-inverter corresponding to the candidate variable group $(L_a, n_b)$ is greater than or equal to the rated peak transmission power $P_{ac,max}$, then output the candidate variable group and proceeds to the formal optimization design segment.

Wherein, the formal optimization design process takes the pre-screened output $(L_i, n_j)$ as input, consisting of three parts: ① modulation mode selection, ② calculation of effective value of the transformer primary and secondary side currents, and ③ calculation of the conduction loss within the power frequency period, the specific process is as follows:

① Modulation mode selection: for the input variables $(L_i, n_j)$, in each switching period within an power frequency period, determine the modulation mode of the micro-inverter. If $|M|\leq D_1(1-2D_1)$, then the modulation mode corresponds to mode three; if $|M|>D_1(1-2D_1)$, then the modulation mode corresponds to mode two. In the above expression, M is the transmission power ratio of the micro-inverter, defined as $$M=\frac{4f_{sw}L_k}{nV_{dc}}i_{gref}\cdot\mathrm{sgn}(v_g),$$

wherein n is the turn ratio of the secondary side and primary side of the high-frequency transformer, $v_{pv}$ is the DC side bus capacitance voltage, $f_{sw}$ is the switching frequency of the micro-inverter, $L_k$ is the inductance value of leakage inductance of the transformer converted to the secondary side, and $\mathrm{sgn}(v_g)$ is the sign function of the grid side voltage.

② Calculation of effective value of the transformer primary and secondary side currents: for the input variables $(L_i, n_j)$, for each switching period within the power frequency period, calculate the effective value of the secondary side current of the transformer $$i_{s,rms}^{(i,j)}$$

and the effective value of the primary side current of the transformer $$n_j i_{s,rms}^{(i,j)}$$

under the corresponding modulation mode. Repeat process ① and ② until all switching periods within the power frequency period are traversed ③ Calculation of the conduction loss within the power frequency period: for the input variables ($L_i$, $n_j$), calculate and record the conduction loss of the micro-inverter within the power frequency period according to the effective value of the secondary side current of the transformer $$i_{s,rms}^{(i,j)}$$

and the effective value of the primary side current of the transformer $$n_j i_{s,rms}^{(i,j)}$$

for each switching period within the power frequency period, as well as the conduction resistance of the selected primary and secondary switching tubes.

Repeat the pre-screening and the three processes described above (i.e., scanning process), scan all the candidate values of n and $L_k$, and the ($L_i$, $n_j$) corresponding to the minimum conduction loss of the micro-inverter within the power frequency period after scanning is the optimal magnetic element parameter.

An embodiment of the present invention provides a method of hybrid optimization design for magnetic element parameters of a micro-inverter based on mode switching, which carries out a hybrid optimization design of the primary and secondary side turn ratio of the high-frequency transformer and the transformer leakage inductance of the micro-inverter, according to the working characteristics of the micro-inverter switching between multiple modulation modes within the power frequency period and in combination with a power point defined by the European weighted efficiency, so as to maximize the European weighted efficiency of the micro-inverter.

Furthermore, the method of hybrid optimization design for magnetic element parameters of a micro-inverter based on mode switching provided in this embodiment may comprise the following steps:

The turn ratio of the primary and secondary side of the high-frequency transformer is 1:n, and the value of leakage inductance of the transformer converted to the secondary side of the transformer is $L_k$, and the value of the transformer excitation inductance converted to the primary side of the transformer is $L_m$;

The variable to be optimized n comprises s candidate values, $n=\{n_1, n_2, \ldots, n_j, \ldots, n_s\}$; the variable to be optimized $L_k$ has p candidate values, $L_k=\{L_1, L_2, \ldots, L_i, \ldots, L_p\}$;

Pre-screen the candidate values of the two variables to be optimized, use the pre-screened candidate values ($L_i$, $n_j$) as input variables, perform scan the candidate value $n_j$ and the candidate value $L_i$, and obtain the European weighted efficiency corresponding to the candidate values ($L_i$, $n_j$);

Repeat the above steps, scan all candidate values of the variable n to be optimized and the variable $L_k$ to be optimized, and the obtained input variable corresponding to the maximum value of the European weighted efficiency is the optimal magnetic element parameter.

In a preferred embodiment, the calculation method for European weighted efficiency comprises:

Measure and calculate the efficiencies of the micro-inverter $\eta=\{\eta_{5\%}, \eta_{10\%}, \eta_{20\%}, \eta_{30\%}, \eta_{50\%}, \eta_{100\%}\}$ corresponding to 5%, 10%, 20%, 30%, 50% and 100% power points, and perform weighted efficiency calculation to obtain the European weighted efficiency;

Wherein the 5%, 10%, 20%, 30%, 50% and 100% power points are the power points defined by European weighted efficiency, and their corresponding weighted coefficients are W={0.03, 0.06, 0.13, 0.10, 0.48, 0.20}, respectively;

In a preferred embodiment, the pre-screening the candidate values of the two variables to be optimized comprises:

Calculate the maximum transmission power $P_{max}$(a,b) of the micro-inverter at the point of 100% power corresponding to each set of candidate values ($L_a$, $n_b$);

If the maximum transmission power $P_{max}$(a,b) of the micro-inverter is less than the rated peak transmission power $P_{ac,max}$, take the next set of candidate values ($L_{a+1}$, $n_1$) when b+1>s, otherwise take the next set of candidate values ($L_a$, $n_{b+1}$); re-run the pre-screening process until the maximum transmission power of the micro-inverter at the point of 100% power corresponding to candidate values is greater than or equal to the rated peak transmission power;

If the maximum transmission power $P_{max}$(a,b) of the micro-inverter is greater than or equal to the rated peak transmission power $P_{ac,max}$, then output the set of candidate values as input variables;

Wherein the maximum transmission power $P_{max}$(a,b) of the micro-inverter at the point of 100% power corresponding to the candidate values ($L_a$, $n_b$) is calculated as follows:

$$P_{max}(a, b) = \frac{n_b V_{dc} V_m}{16 f_{sw} L_a}$$

In the formula, $n_b$ is the turn ratio of the secondary side and primary side of the high-frequency transformer in the candidate value, $f_{sw}$ is the switching frequency of the micro-inverter, $L_a$ is the inductance value of leakage inductance of the transformer converted to the secondary side, $V_{dc}$ is the DC side bus capacitance voltage, and $V_m$ is the rated voltage amplitude of the power grid.

In a preferred embodiment, the scanning the candidate value $n_j$ and the candidate value $L_i$ comprises:

Select the working power points of the micro-inverter in sequence from power points defined by the European weighted efficiency definition;

For the input variables ($L_i$, $n_j$), in conjunction with the selected working power points, determine the modulation mode of the micro-inverter for each switching period within the power frequency period;

For the input variables ($L_i$, $n_j$), in conjunction with the selected working power points, for each switching period within the power frequency period, calculate the effective value of; the secondary side current of the transformer $$i_{s,rms}^{(i,j)}$$

and the effective value of the primary side current of the transformer $$n_j i_{s,rms}^{(i,j)}$$

under the corresponding modulation mode;

Repeat the above modulation mode determination process and the current effective value calculation process until all switching periods within the power frequency period are traversed;

For the input variables ($L_i$, $n_j$), in conjunction with the selected working power points, calculate the conduction loss of the micro-inverter and the micro-inverter efficiency within the power frequency period according to the effective value of the secondary side current of the transformer $$i_{s,rms}^{(i,j)}$$

and the effective value of the primary side current of the transformer $$n_j i_{s,rms}^{(i,j)}$$

for each switching period within the power frequency period, as well as the conduction resistance of the selected primary and secondary switching tubes; if the selected working power point is 100% at this time, then calculate the European weighted efficiency corresponding to the input variable ($L_i$, $n_j$) according to the European weighted efficiency calculation method; otherwise, re-select the next working power point of the micro-inverter until the European weighted efficiency corresponding to the input variable ($L_i$, $n_j$) is obtained when the working power point is 100%.

In a preferred embodiment, there are three modulation modes of the micro-inverter, which are divided according to the range of values of the internal phase shift angle $D_1$ and the external phase shift angle $D_2$ of the micro-inverter; wherein:

The internal phase shift angle $D_1$ is defined as the angle between the negative rising edge of the primary side square wave voltage of the transformer and the positive rising edge of the primary side square wave voltage of the transformer, $0 \le D_1 \le 0.5$;

The external phase shift angle $D_2$ is defined as the angle between the fundamental wave of the transformer primary side square wave voltage and the fundamental wave of the transformer secondary side square wave voltage, $-0.5 \le D_2 \le 0.5$;

When the external phase shift angle $D_2$ satisfies $(1-D_1)/2 < D_2 \le 0.5$ or $-0.5 < D_2 \le -(1-D_1)/2$, the positive electrical level part of the primary side square wave voltage completely coincides with the negative electrical level part of the secondary side square wave voltage, the corresponding modulation mode is mode one, at this time, the transformer current is close to a sine wave, and the effective value of transformer current is maximum, but the zero voltage soft switching of the primary and secondary side switching tubes is the easiest to achieve;

When the external phase shift angle $D_2$ satisfies $D_1/2 < D_2 \le (1-D_1)/2$ or $-(1-D_1)/2 < D_2 \le -D_1/2$, a part of the positive electrical level of the primary side voltage coincides with the positive electrical level of the secondary side voltage, the other part coincides with the negative electrical level of the secondary side voltage, the corresponding modulation mode is mode two, at this time, the transformer current is close to a trapezoidal wave, the effective value of transformer current is moderate, and the zero voltage soft switching of the primary and secondary side switching tubes is relatively easier to achieve;

When the external phase shift angle $D_2$ satisfies $0 \le D_2 \le D_1/2$ or $-D_1/2 \le D_2 \le 0$, the positive electrical level part of the primary side voltage completely coincides with the positive electrical level part of the secondary side voltage, the corresponding modulation mode is mode three, at this time, the transformer current is close to a triangular wave, among the three modulation modes, mode three has the smallest effective current of the transformer, but the zero voltage soft switching of the primary and secondary side switching tubes is the most difficult to achieve.

Furthermore, for the input variables ($L_i$, $n_j$) in conjunction with the selected working power point, in each switching period within an power frequency period, determine the modulation mode of the micro-inverter, comprising:

If $|M| \le D_1(1-2D_1)$, then the modulation mode corresponds to mode three; if $|M| > D_1(1-2D_1)$, then the modulation mode corresponds to mode two; in the formula, $D_1$ is the internal shift phase angle, M is the transmission power ratio of the micro-inverter, defined as $$M = \frac{4 f_{sw} L_k}{n V_{dc}} i_{gref} \cdot \mathrm{sgn}(v_g),$$

wherein n is the turn ratio of the secondary side and primary side of the high-frequency transformer, $f_{sw}$ is the switching frequency of the micro-inverter, $L_k$ is the inductance value of leakage inductance of the transformer converted to the secondary side, $\mathrm{sgn}(v_g)$ is the sign function of the grid side voltage, $V_{dc}$ is the DC side bus capacitance voltage, and $i_{gref}$ is the given value of the grid-connection current.

In a preferred embodiment, calculating the effective value of the secondary side current of the transformer $$i_{s,rms}^{(i,j,h)}$$

and the effective value of the primary side current of the transformer $$i_{p,rms}^{(i,j,h)}$$

under the corresponding modulation mode comprises:

The effective value of the secondary side current of the transformer at the hth (h≤6) power point is calculated as follows:

$$i_{s,rms}^{(i,j,h)}=\sqrt{\frac{1}{m}\sum_{r=0}^{m-1}(i_{s,rms,r,h})^2}$$

Wherein m is the number of power frequency period segments; $i_{s,rms,r,h}$ is the effective value of the secondary side current of the transformer within the rth segment of the power frequency period at the hth power point, which is calculated as follows:

$$i_{s,rms,r,h}=\begin{cases}\text{Mode one: }\frac{\sqrt{3n_jV_{dc}|v_{g,r,h}|}}{6f_{sw}L_k}\cdot\sqrt{\left(\begin{array}{c}\left(\frac{4}{m_v}+1\right)D_1^3+12D_1D_2^2-\left(\frac{3}{m_v}+\frac{3}{2}\right)D_1^2-12D_1D_2-6D_2^2+\\3D_1+6D_2+\left(\frac{1}{4m_v}-\frac{5}{4}+\frac{m_v}{16}\right)\end{array}\right)}\\ \text{Mode two: }\frac{\sqrt{3n_jV_{dc}|v_{g,r,h}|}}{6f_{sw}L_k}\cdot\sqrt{\left(\begin{array}{c}\left(\frac{4}{m_v}-\frac{3}{2}\right)D_1^3-8D_2^3-6D_2D_1^2+6D_1D_2^2+\\\left(\frac{3}{2}-\frac{3}{m_v}\right)D_1^2+6D_2^2+\left(\frac{1}{4m_v}-\frac{1}{4}+\frac{m_v}{16}\right)\end{array}\right)}\\ \text{Mode three: }\frac{\sqrt{3n_jV_{dc}|v_{g,r,h}|}}{6f_{sw}L_k}\cdot\sqrt{\left(\begin{array}{c}\left(\frac{4}{m_v}-1\right)D_1^3-12D_1D_2^2+\\\left(\frac{3}{2}-\frac{3}{m_v}\right)D_1^2+6D_2^2+\left(\frac{1}{4m_v}+\frac{m_v}{16}-\frac{1}{4}\right)\end{array}\right)}\end{cases}$$

Wherein $f_{sw}$ is the switching frequency of the micro-inverter, $L_k$ is the inductance value of leakage inductance of the transformer converted to the secondary side, $n_j$ is the turn ratio of the secondary side and primary side of the high-frequency transformer, $V_{dc}$ is the DC side bus capacitance voltage, $|v_{g,r,h}|$ is the power grid voltage at the beginning of the rth segment of the power frequency period at the hth power point, and my is the voltage gain that satisfies $m_v=|v_{g,r,h}|/(n_jV_{dc})$.

The effective value of the primary side current of the transformer is calculated as follows:

$$i_{p,rms}^{(i,j,h)}=n_j\cdot i_{s,rms}^{(i,j,h)}$$

Calculate the conduction loss of the micro-inverter within the power frequency period, comprising the conduction loss of the primary side switching tube of the micro-inverter $P_{loss,pri,h}$, the conduction loss of the secondary side switching tube of the micro-inverter $P_{loss,sec,h}$, and the conduction loss of the micro-inverter transformer $P_{loss,tr,h}$, wherein:

At the hth power point, the conduction loss of the primary side switching tube of the micro-inverter $P_{loss,pri}$ is calculated as follows:

$$P_{loss,pri,h}=4\cdot\left[i_{p,rms}^{(i,j,h)}\right]^2\cdot R_{ds,on,pri}$$

Wherein $R_{ds,on,pri}$ is the on-resistance of a single primary side switching tube.

At the hth power point, the conduction loss of the secondary side switching tube of the micro-inverter $P_{loss,sec,h}$ is calculated as follows:

$$P_{loss,sec,h}=4\cdot\left[i_{s,rms}^{(i,j,h)}\right]^2\cdot R_{ds,on,sec}$$

Wherein $R_{ds,on,sec}$ is the on-resistance of a single secondary side switching tube.

The conduction loss of the micro-inverter transformer $P_{loss,tr,h}$ is calculated as follows:

$$P_{loss,tr,h}=\left[i_{p,rms}^{(i,j,h)}\right]^2\cdot R_{tr,pri}+\left[i_{s,rms}^{(i,j,h)}\right]^2\cdot R_{tr,sec}$$

Wherein $R_{tr,pri}$ and $R_{tr,sec}$ are the wire-wound resistors of the primary and secondary sides of the transformer, respectively, and the efficiency of the micro-inverter at the hth power point within the power frequency period is calculated as follows:

$$\eta_h=\frac{P_h}{P_h+P_{loss,pri,h}+P_{loss,sec,h}+P_{loss,tr,h}}$$

After calculating the efficiency for each of the six power points respectively, a 1×6 efficiency matrix η can be obtained.

The European weighted efficiency $\eta_{eu}$ of the micro-inverter is calculated as follows:

$$\eta_{eu}=\eta\times W^T$$

Wherein $W^T$ is the transposition of the weighted coefficient matrix according to claim 7. The method provided in this embodiment of the present invention is a method of hybrid optimization design for magnetic element parameters of a dual-active-bridge-type micro-inverter based on mode switching and maximizing the European weighted efficiency. In this method, according to the working characteristics of the micro-inverter switching between multiple modulation modes within the power frequency period and in combination with six power points defined by the European weighted efficiency, a hybrid optimization design of the primary and secondary side turn ratio of the high-frequency transformer and the transformer leakage inductance is carried out, so as to maximize the European weighted efficiency. Wherein:

The circuit structure of the dual-active-bridge-type micro-inverter, high-frequency transformer parameters and modulation mode of the micro-inverter are consistent with those in the above embodiment of the present invention;

The calculation method for European weighted efficiency is: to measure and calculate the efficiencies of the micro-inverter $\eta=\{\eta_{5\%}, \eta_{10\%}, \eta_{20\%}, \eta_{30\%}, \eta_{50\%}, \eta_{100\%}\}$ corresponding to 5%, 10%, 20%, 30%, 50% and 100% power points, and to calculate weighted efficiency, wherein the weighted coefficients corresponding to these six power points are W={0.03, 0.06, 0.13, 0.10, 0.48, 0.20}, respectively;

The variable to be optimized n has s candidate values, $n=\{n_1, n_2, \ldots, n_j, \ldots, n_s\}$; the variable to be optimized $L_k$ has p candidate values, $L_k=\{L_1, L_2, \ldots, L_i, \ldots, L_p\}$.

The method provided in this embodiment of the present invention mainly consists of two segments, namely a pre-screening segment and a formal optimization design segment.

Wherein the principle of pre-screening is:

Calculate the maximum transmission power $P_{max}(a,b)$ of the micro-inverter at the point of 100% power corresponding to each set of candidate variable group $(L_a, n_b)$;

If $P_{max}(a,b)$ is less than the rated peak transmission power $P_{ac,max}$, take the next set of candidate variable group $(L_{a+1}, n_{b+1})$ for pre-screening when b+1>s, otherwise take the next set of candidate values $(L_a, n_{b+1})$ for re-pre-screening;

If $P_{max}(a,b)$ is greater than or equal to the rated peak transmission power $P_{ac,max}$, then output the set of candidate variables, and proceed to the formal optimization design process. Wherein the maximum transmission power $P_{max}(a,b)$ is calculated as follows:

$$P_{max}(a, b) = \frac{n_b V_{dc} V_m}{16 f_{sw} L_a}$$

Wherein $n_b$ is the turn ratio of the secondary side and primary side of the high-frequency transformer in the candidate value, $f_{sw}$ is the switching frequency of the micro-inverter, $L_a$ is the inductance value of leakage inductance of the transformer converted to the secondary side, $V_{dc}$ is the DC side bus capacitance voltage, and $V_m$ is the rated voltage amplitude of the power grid.

Wherein the formal optimization design process takes the pre-screened output $(L_i, n_j)$ as input and consists of four parts: ① selection of transmission power points of the micro-inverter, ② selection of modulation modes, ③ calculation of the effective values of transformer primary and secondary side currents, and ④ calculation of the conduction losses within power frequency periods, with the specific process as follows:

① Selection of transmission power points of the micro-inverter: select the working power points of the micro-inverter in sequence from six power points: 5%, 10%, 20%, 30%, 50%, and 100%, and enter the process ②.

② Selection of modulation modes: for the input variables $(L_i, n_j)$, for the selected working power points, determine the modulation mode of the micro-inverter for each switching period within the power frequency period. If $|M| \le D_1(1-2D_1)$, then the modulation mode corresponds to mode three; if $|M| > D_1(1-2D_1)$, then the modulation mode corresponds to mode two, and enter process ③.

③ Calculation of the effective values of transformer primary and secondary side currents: for the input variables $(L_i, n_j)$, for the selected working power points, for each switching period within the power frequency period, calculate the effective value of the secondary side current of the transformer $$i_{s,rms}^{(i,j)}$$

and the effective value of the primary side current of the transformer $$n_j i_{s,rms}^{(i,j)}$$

under the corresponding modulation mode. Repeat process ② and process ③ until all switching periods within the power frequency period are traversed, and then enter process ④.

④ Calculation of the conduction losses within power frequency periods: for the input variables $(L_i, n_j)$, for the selected working power points, calculate and record the conduction loss and efficiency of the micro-inverter within the power frequency period according to the effective value of the secondary side current of the transformer $$i_{s,rms}^{(i,j)}$$

and the effective value of the primary side current of the transformer $$n_j i_{s,rms}^{(i,j)}$$

for each switching period within the power frequency period, as well as the conduction resistance of the selected primary and secondary switching tubes. If the selected working power point is 100% at this time, then calculate the European weighted efficiency corresponding with the input variable $(L_i, n_j)$ according to the European weighted efficiency calculation method, record the efficiency and return to the pre-screening process; otherwise, return to the process ①, and select the next working power point of the micro-inverter.

Repeat the pre-screening and the four processes described above (i.e., scanning process), scan all candidate values of n and $L_k$, and after scanning, $(L_i, n_j)$ corresponding to the maximum value of the European weighted efficiency is the optimal magnetic element parameter.

The optimization design method in the above two embodiments of the present invention can design the magnetic element parameters n and $L_k$ in the high-frequency transformer shown in FIG. 1. Furthermore, the variable n to be optimized has s candidate values, $n=\{n_1, n_2, \ldots, n_j, \ldots, n_s\}$; and the variable $L_k$ to be optimized has p candidate values, $L_k=\{L_1, L_2, \ldots, L_i, \ldots, L_p\}$.

Figure 10:
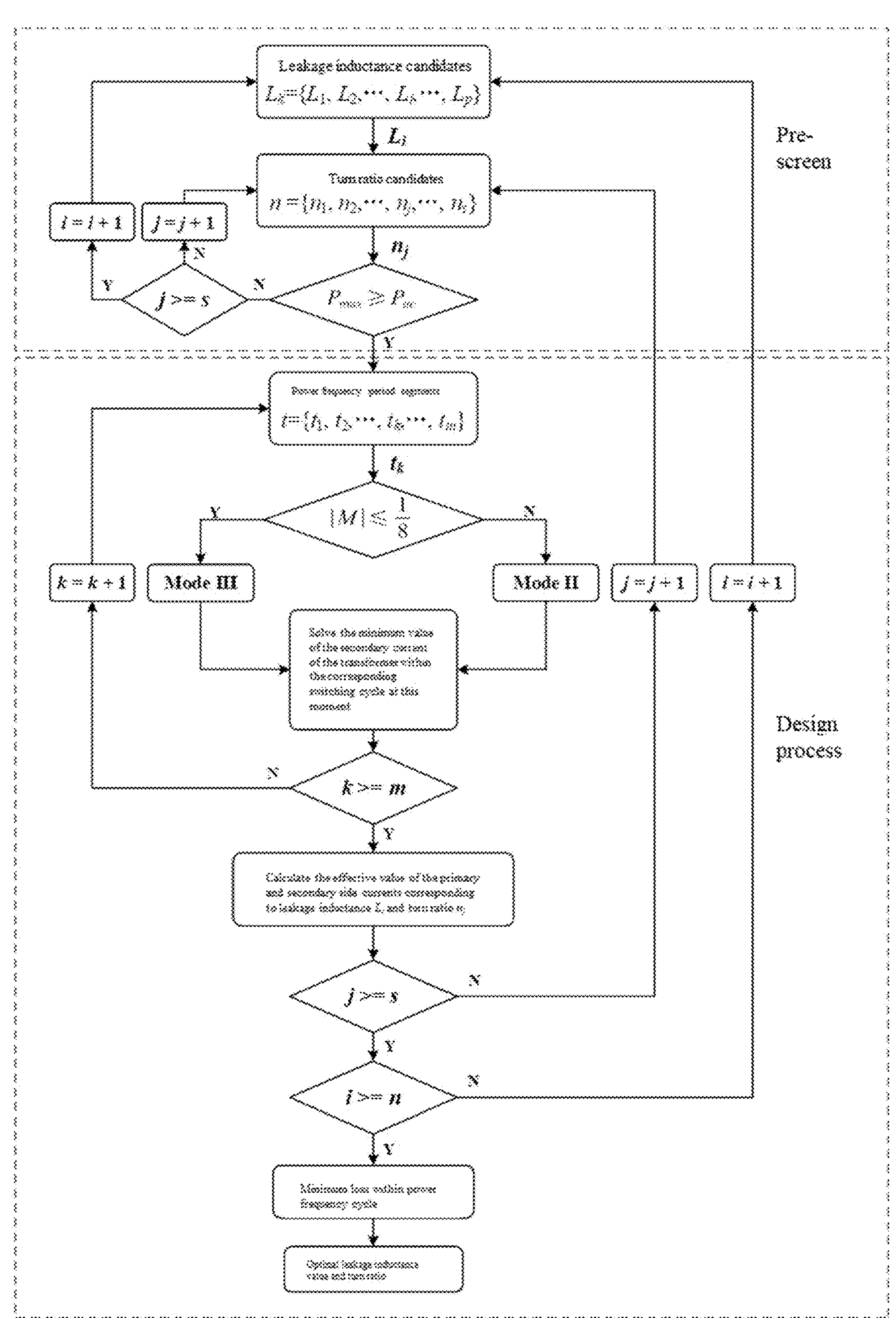
FIG. 10 shows a flowchart of a hybrid optimization design method of magnetic element parameters of a dual-active-bridge-type micro-inverter based on mode switching and resulting in the highest full load efficiency in a preferred embodiment of the present invention.

FIG. 10 shows a flowchart of a hybrid optimization design method of magnetic element parameters of a dual-active-bridge-type micro-inverter based on mode switching and maximizing the full load efficiency. With reference to FIG. 10, it is necessary to pre-screen the candidate values of the two variables to be optimized when carrying out the design, and the principle of pre-screening is:

If the maximum transmission power $P_{max}(i,j)$ of the micro-inverter corresponding to the candidate variable group $(L_i, n_j)$ is less than the rated peak transmission power $P_{ac,max}$, then take the next set of candidate variable group $(L_i+1, n_1)$ or $(L_i, n_j+1)$, and repeat the judgment process;

If the maximum transmission power $P_{max}(i,j)$ of the micro-inverter corresponding to the candidate variable group $(L_i, n_j)$ is greater than the rated peak transmission power $P_{ac,max}$, then output the candidate variable group and enter the following design flow.

As shown in FIG. 10, the optimization design process takes the pre-screened output ($L_i$, $n_j$) as input, and consists of three parts: ① modulation mode selection, ② calculation of effective value of the transformer primary and secondary side currents, and ③ calculation of the conduction loss within the power frequency period. The specific process is as follows:

① Modulation mode selection: for the input variables ($L_i$, $n_j$), in each switching period within an power frequency period, determine the modulation mode of the micro-inverter. If $|M| \le D_1(1-2D_1)$, then the working mode corresponds to mode three; if $|M| > D_1(1-2D_1)$, then the working mode corresponds to mode two. In the above expression, M is the transmission power ratio of the micro-inverter, and defined as $$M = \frac{4f_{sw}L_k}{nV_{dc}} i_{gref} \cdot \mathrm{sgn}(v_g),$$

wherein n is the turn ratio of the secondary side and primary side of the high-frequency transformer, $v_{pv}$ is the DC side bus capacitance voltage, $f_{sw}$ is the switching frequency of the micro-inverter, $L_k$ is the inductance value of leakage inductance of the transformer converted to the secondary side, and $\mathrm{sgn}(v_g)$ is the sign function of the grid side voltage.

② Calculation of effective value of the transformer primary and secondary side currents: for the input variables ($L_i$, $n_j$), for each switching period within the power frequency period, calculate the effective value of the secondary side current of the transformer $$i_{s,rms}^{(i,j)}$$

and the effective value of the primary side current of the transformer $$n_j i_{s,rms}^{(i,j)}$$

under the corresponding modulation mode. Repeat process ① and ② until all switching periods within the power frequency period are traversed ③ Calculation of the conduction loss within the power frequency period: for the input variables ($L_i$, $n_j$), calculate and record the conduction loss of the micro-inverter within the power frequency period according to the effective value of the secondary side current of the transformer $$i_{s,rms}^{(i,j)}$$

and the effective value of the primary side current of the transformer $$i_{p,rms}^{(i,j)}$$

for each switching period within the power frequency period, as well as the conduction resistance of the selected primary and secondary switching tubes.

Repeat the pre-screening and the three processes described above, and scan all the candidate values of n and $L_k$, and after scanning the ($L_i$, $n_j$) corresponding to the minimum conduction loss of the micro-inverter within the power frequency period is the optimal magnetic element parameter.

In FIG. 10, i is a count value of the leakage inductance candidates, with the value range of 1~p, and p is the number of leakage inductance candidates; j is a count value of the turn ratio candidates, with the value range of 1~s; s is the maximum count value of the turn ratio candidates; k is a count value of power frequency period segments, with the value range of 1~m; and m is the maximum number of power frequency period segments.

Figure 11:
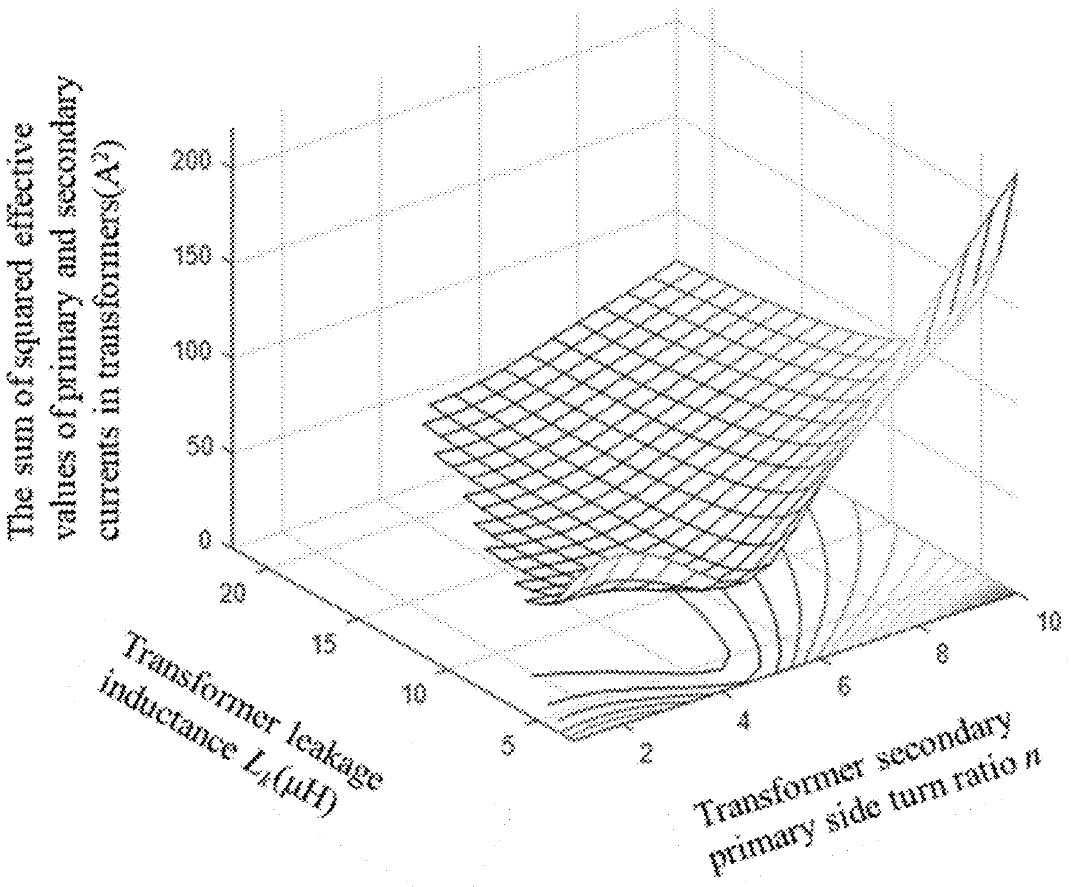
FIG. 11 shows a schematic diagram of the curved surface where the sum of squares of the primary and secondary side currents of a micro-inverter varies with transformer leakage inductance and transformer turn ratio in a preferred embodiment of the present invention.

Furthermore, through the above optimization design method based on mode switching and maximizing the full load efficiency, a specific example of the optimization design of the magnetic element parameters of high-frequency transformer in the micro-inverter can be given under the parameter conditions of the micro-inverter shown in Table 1. As shown in FIG. 11, a schematic diagram of the curved surface where the sum of squares of the primary and secondary side currents of a micro-inverter varies with transformer leakage inductance and transformer turn ratio is shown, the smallest sum of squares of the primary and secondary side currents of the micro-inverter corresponds to the lowest point of the curved surface, and its conduction loss is also the smallest, therefore, the optimal magnetic element parameter of the transformer can be obtained as $L_k$=12 μH, and n=4.

TABLE 1

| Parameter | Numerical value (unit) | Parameter | Numerical value (unit) |
|---|---|---|---|
| DC voltage | 30 V | Power grid voltage frequency | 50 Hz |
| Power grid voltage | 220 Vrms | Switching frequency | 100 kHz |
| Given value of the grid-side current | 2.73 Arms | Power factor angle | 0° |

Figure 12:
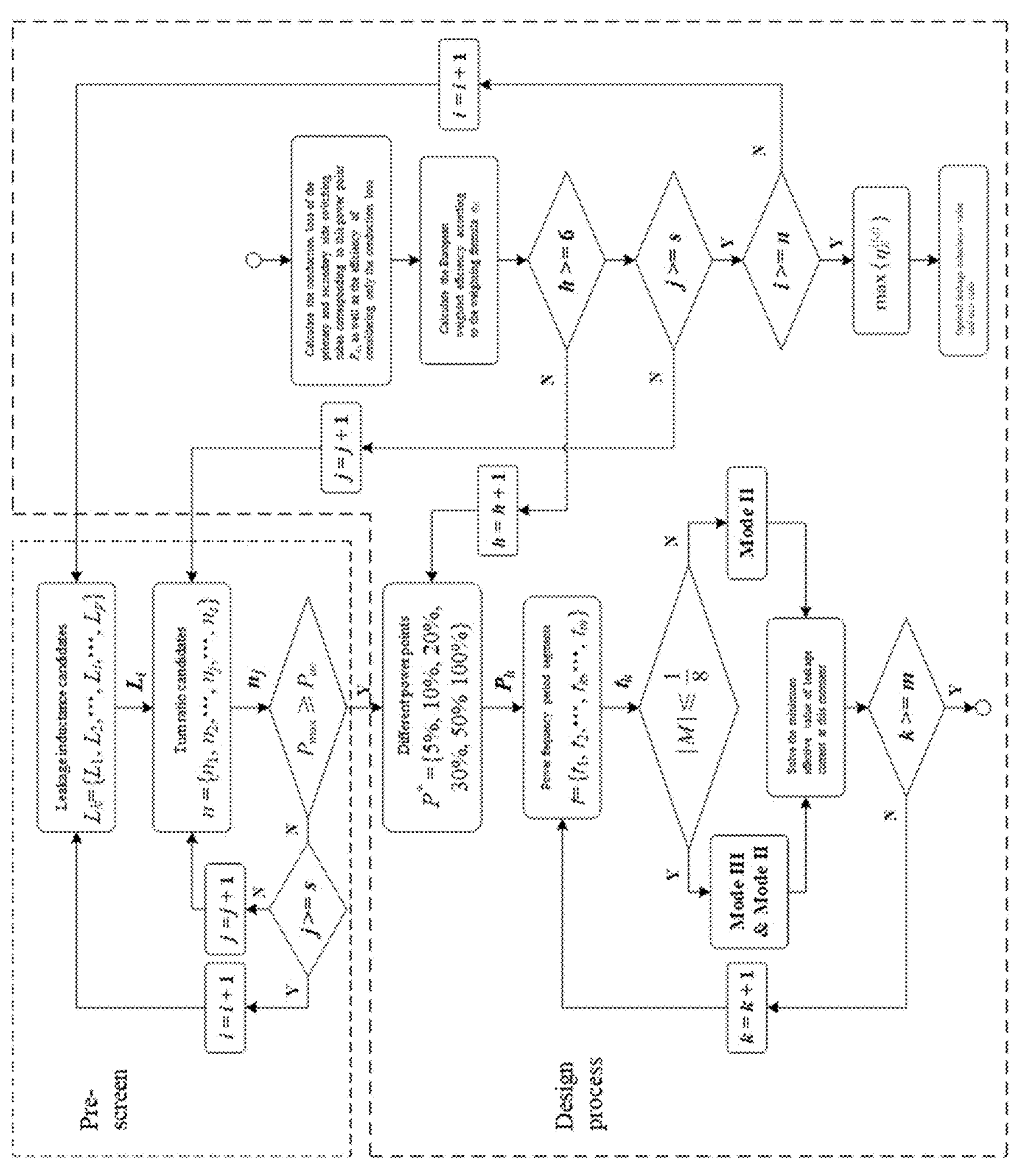
FIG. 12 shows a flowchart of a hybrid optimization design method of magnetic element parameters of a dual-active-bridge-type micro-inverter, based on mode switching, and maximizing the European weighted efficiency in an embodiment of the present invention.

FIG. 12 shows a flowchart of a hybrid optimization design method of magnetic element parameters of a dual-active-bridge-type micro-inverter based on mode switching and maximizing the European weighted efficiency. With reference to FIG. 12, the optimization method is based on the above optimization method based on mode switching and maximizing the full load efficiency, and combines with six power points defined by the European weighted efficiency, and carries out a hybrid optimization design of the primary and secondary side turn ratio of the high-frequency transformer and the transformer leakage inductance, so as to maximize the European weighted efficiency.

Furthermore, the calculation method for European weighted efficiency is: to measure and calculate the efficiencies of the micro-inverter $\eta=\{\eta_{5\%}, \eta_{10\%}, \eta_{20\%}, \eta_{30\%}, \eta_{50\%}, \eta_{100\%}\}$ corresponding to 5%, 10%, 20%, 30%, 50% and 100% power points, and calculate the weighted efficiency, where the weighted coefficients corresponding to these six power points are W={0.03, 0.06, 0.13, 0.10, 0.48, 0.20}, respectively.

With reference to FIG. 12, it is necessary to pre-screen the candidate values of the two variables to be optimized when carrying out the design. Specifically, the principle of pre-screening is:

Calculate the maximum transmission power $P_{max}(i,j)$ of the micro-inverter at the point of 100% power corresponding to each set of candidate variable group $(L_i, n_j)$;

If $P_{max}(i,j)$ is less than the rated peak transmission power $P_{ac,max}$, take the next set of candidate variable group $(L_{i+1}, n_{j+1})$ or $(L_i, n_{j+1})$ for pre-screening;

If $P_{max}(i,j)$ is greater than the rated peak transmission power $P_{ac,max}$, then output the set of candidate variables, and proceed to the following design process.

With reference to FIG. 12, the optimization design process takes the pre-screened output $(L_i, n_j)$ as input and consists of four parts: ① selection of transmission power points of the micro-inverter, ② selection of modulation modes, ③ calculation of the effective current values of transformer primary and secondary side currents and ④ calculation of the conduction losses within power frequency periods, with the specific process as follows:

① Selection of transmission power points of the micro-inverter: select the working power points of the micro-inverter in sequence from six power points: 5%, 10%, 20%, 30%, 50%, and 100%, and enter the process ②.

② Selection of modulation modes: for the input variables $(L_i, n_j)$, for the selected working power points, determine the modulation mode of the micro-inverter for each switching period within the power frequency period. If $|M| \le D_1(1-2D_1)$, then the working mode corresponds to mode three; if $|M| > D_1(1-2D_1)$, then the working mode corresponds to mode two, and enters process ③.

③ Calculation of the effective current values of transformer primary and secondary side currents: for the input variables $(L_i, n_j)$, for the selected working power points, for each switching period within the power frequency period, calculate the effective value of the secondary side current of the transformer $$i_{s,rms}^{(i,j)}$$

and the effective value of the primary side current of the transformer $$n_j i_{s,rms}^{(i,j)}$$

under the corresponding modulation mode. Repeat process ② and process ③ until all switching periods within the power frequency period are traversed, and then enter process ④.

④ Calculation of the conduction loss within power frequency period: for the input variables $(L_i, n_j)$, for the selected working power points, calculate and record the conduction loss and efficiency of the micro-inverter within the power frequency period according to the effective value of the secondary side current of the transformer $$i_{s,rms}^{(i,j)}$$

and the effective value of the primary side current of the transformer $$n_j i_{s,rms}^{(i,j)}$$

for each switching period within the power frequency period, as well as the conduction resistance of the selected primary and secondary switching tubes. If the selected working power point is 100% at this time, then calculate the European weighted efficiency corresponding to the input variable $(L_i, n_j)$ according to the European weighted efficiency calculation method, record the efficiency and return to the pre-screening process; otherwise, return to the process ①, and select the next working power point of the micro-inverter.

Repeat the pre-screening and the four processes described above (i.e., scanning process), scan all candidate values of n and $L_k$, and after scanning, $(L_i, n_j)$ corresponding to the maximum value of the European weighted efficiency is the optimal magnetic element parameter.

In FIG. 12, i is a count value of the leakage inductance candidates, with the value range of 1~p; and p is the number of leakage inductance candidates; j is a count value of the turn ratio candidates, with the value range of 1~s; and p is the number of leakage inductance candidates; s is the number of the turn ratio candidates; k is a count value of power frequency period segments, with the value range of 1~m; and m is the number of power frequency period segments; and h is a count value of the power points, with the value range of 1~6.

Figure 13:
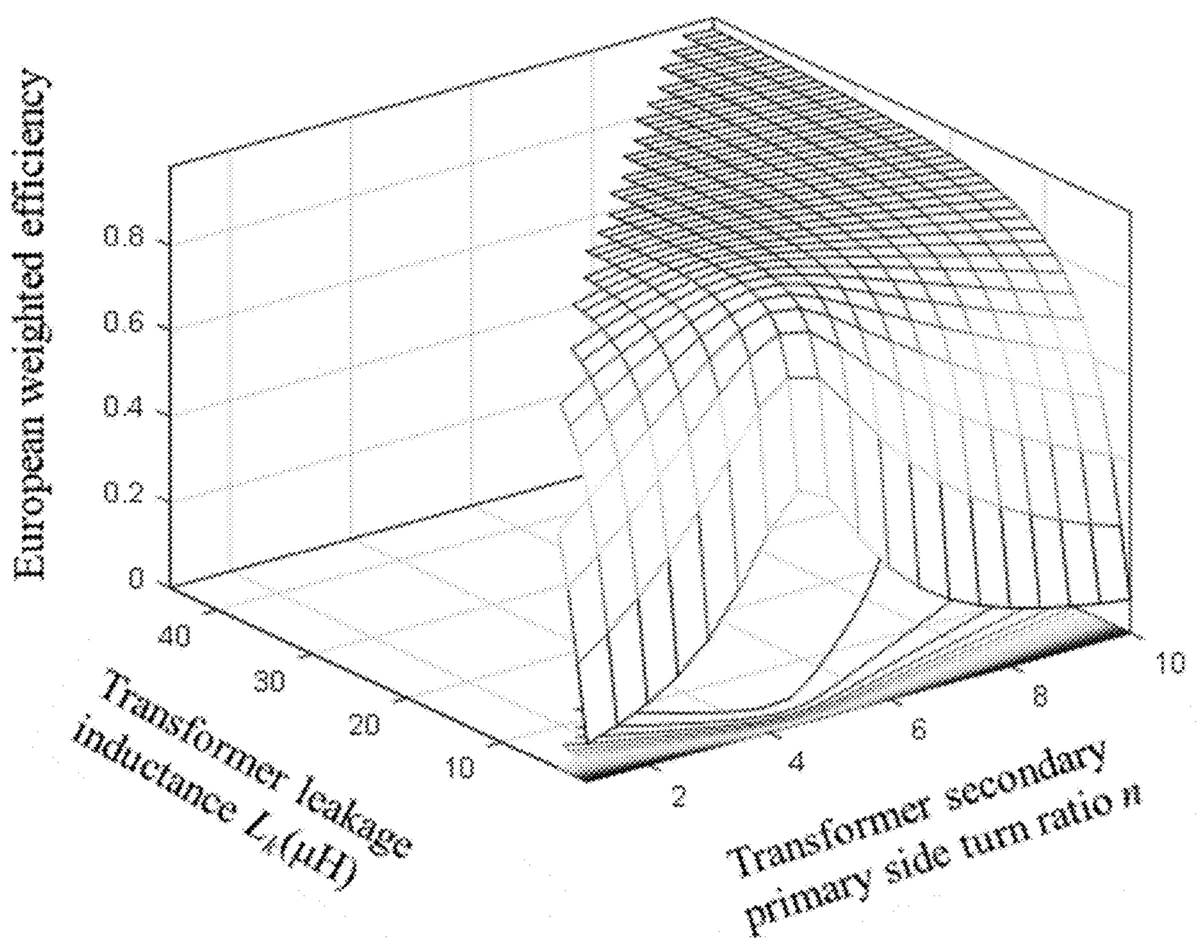
FIG. 13 shows a schematic diagram of the curved surface where the European weighted efficiency of a micro-inverter varies with transformer leakage inductance and transformer turn ratio in a preferred embodiment of the present invention.

Furthermore, through the above optimization design method based on mode switching and maximizing the European weighted efficiency, a specific example of the optimization design of the magnetic element parameters of high-frequency transformer in the micro-inverter can be given under the parameter conditions of the micro-inverter shown in Table 2. As shown in FIG. 13, a schematic diagram of the curved surface where the European weighted efficiency of a micro-inverter varies with transformer leakage inductance and transformer turn ratio is shown, and the highest European weighted efficiency of the micro-inverter corresponds to the highest point of the surface, so that the magnetic element parameter that maximize the maximum European weighted efficiency can be obtained, that is $L_k$=19 μH and n=4.5.

TABLE 2

| Parameter | Numerical value (unit) | Parameter | Numerical value (unit) |
|---|---|---|---|
| DC voltage | 30 V | Power grid voltage frequency | 50 Hz |
| Power grid voltage | 220 Vrms | Switching frequency | 100 kHz |
| Given value of the grid-side current | 2.73 Arms | Power factor angle | 0° |

Of course, the specific circuits of the above embodiments are only preferred embodiments of one implementation of the present invention, and are not intended to limit the present invention, and in other embodiments may also be other forms of circuits realizing the same function.

The method of hybrid optimization design for magnetic element parameters of a dual-active-bridge-type micro-inverter based on mode switching and maximizing the full load efficiency provided in the above embodiments of the present invention may maximize the full load efficiency of the micro-inverter under the designed magnetic element parameters of the high-frequency transformer. Meanwhile, by the hybrid optimization design of the transformer turn ratio and the transformer leakage inductance parameters, while satisfying the power transmission constraints of the micro-inverter, it also reduces the transformer primary and secondary side currents under the optimized parameters.

The method of hybrid optimization design for magnetic element parameters of a dual-active-bridge-type micro-inverter based on mode switching and maximizing the European weighted efficiency provided in the above embodiments of the present invention, by comprehensively considering the efficiency of the micro-inverter at six power points, greatly improves the light load efficiency of the micro-inverter under the designed high-frequency transformer parameters, which is conducive to the enhancement of the European weighted efficiency, so that the micro-inverter still has a higher efficiency when the photovoltaic panels are obstructed, the light intensity is insufficient, or the ambient temperature is unsuitable.

The optimization design method of magnetic element parameters of the micro-inverter based on mode switching control provided by above embodiment of the present invention, based on the characteristics of the micro-inverter switching between multiple modulation modes within the power frequency period, carries out the hybrid optimization design for the two mutually coupled variables of the turn ratio n and leakage inductance $L_k$ of the high-frequency transformer in the micro-inverter, while satisfying the power transmission constraints, also minimizes the converter conduction loss under the same transmission power conditions. Through this optimization design method, the conduction loss of the micro-inverter under full load condition can be minimized; through the comprehensive consideration of the conduction loss at different power points, the European weighted efficiency of the micro-inverter can be maximized; through the comprehensive consideration of the effects of the two design variables of the high-frequency transformer turn ratio and leakage inductance on the transmission power and the efficiency of the micro-inverter, the designed parameters are more practical.

In summary, the above embodiments provide a detailed description of the method for improving the efficiency of the micro-inverter and different configurations of the dual-active-bridge-type micro-inverter, of course, the present invention comprises but is not limited to the configurations enumerated in the above embodiments, and any transformations based on the configurations provided in the above embodiments fall within the scope of protection of the present invention. Those skilled in the art can draw inferences according to the contents of the above embodiments.

The various embodiments in the present specification are described in a progressive manner, and each embodiment focuses on the differences from other embodiments, and same and similar parts between each embodiment can be referred to each other. For the system disclosed in the embodiments, since it corresponds to the method disclosed in the embodiments, the description is relatively simple, and it is sufficient to refer to the description in the method section for the relevant points.

The above description is only a description of the preferred embodiments of the present invention, and is not any limitation of the scope of the present invention, and any changes or modifications made by those ordinary skilled in the art of the present invention in accordance with the above disclosure are within the scope of protection of the claims.

What is claimed is:

1. A method for improving the efficiency of a micro-inverter, characterized by comprising:

performing power modulation mode switching of a dual-active-bridge-type micro-inverter, such that the power is bi-directionally transmitted from a DC side to an AC side and from the AC side to the DC side, thereby reducing an effective value of a secondary side current of a transformer; and according to a modulation mode switching characteristic of the dual-active-bridge-type micro-inverter within a power frequency period, performing hybrid optimization on a turn ratio of a primary side to a secondary side and a transformer leakage inductance of a high-frequency transformer of the dual-active-bridge-type micro-inverter, wherein performing power modulation mode switching of a dual-active-bridge-type micro-inverter, such that the power is bi-directionally transmitted from a DC side to an AC side and from the AC side to the DC side, thereby reducing an effective value of a secondary side current of a transformer comprises:

determining an internal phase shift angle $D_1$ and an external phase shift angle $D_2$, the internal phase shift angle $D_1$ is an angle between a negative rising edge of a square wave voltage generated by a primary side square wave generating circuit and a positive rising edge of the square wave voltage generated by the primary side square wave generating circuit; the external phase shift angle $D_2$ is an angle between a fundamental wave of the square wave voltage generated by the primary side square wave generating circuit of the transformer and a fundamental wave of a square wave voltage generated by a secondary side square wave generating circuit of the transformer;

directly controlling the primary side square wave generating circuit by using the internal phase shift angle $D_1$ to generate a corresponding square wave voltage, controlling the secondary side square wave generating circuit by using the external phase shift angle $D_2$ summed with an output of the current loop closed-loop control by an adder, to generate a corresponding square wave voltage, to realize the given transmission power of the micro-inverter;

taking the internal phase shift angle $D_1$ and the external phase shift angle $D_2$ as two control degrees of freedom of the micro-inverter, according to the two control degrees of freedom of the micro-inverter, dividing the modulation mode of transmission power into mode one, mode two and mode three, and according to the instantaneous transmission power of the micro-inverter and the value of the internal phase shift angle $D_1$, switching the micro-inverter between mode three and mode two.

2. A dual-active-bridge-type micro-inverter, implements the method according to claim 1.

3. The method for improving the efficiency of a micro-inverter according to claim 1, wherein the range of values of the internal phase shift angle $D_1$ is $0 \le D_1 \le 0.5$, and the range of values of the external phase shift angle $D_2$ is $-0.5 \le D_2 \le 0.5$;

according to the two control degrees of freedom, dividing the modulation mode of transmission power into mode one, mode two and mode three comprises:

when the external phase shift angle $D_2$ satisfies $(1-D_1)/2 < |D_2| \le 0.5$, the corresponding modulation mode is mode one;

when the external phase shift angle $D_2$ satisfies $D_1/2 < |D_2| \le (1-D_1)/2$, the corresponding modulation mode is mode two;

when the external phase shift angle $D_2$ satisfies $0 \le |D_2| < D_1/2$, the corresponding modulation mode is mode three.

4. The method for improving the efficiency of a micro-inverter according to claim 3, wherein the mode one comprises:

when the transmission power direction is from the DC side to the AC side, the transmission power range corresponding to mode one is $$0 \leqslant P_1 \leqslant \frac{1}{8}\frac{nV_{bat}|v_g|}{4f_{sw}L_k},$$

and the maximum transmission power is obtained at $D_1=0.25$ and $D_2=0.375$;

when the transmission power direction is from the AC side to the DC side, the transmission power range corresponding to mode one is $$-\frac{1}{8}\frac{nV_{bat}|v_g|}{4f_{sw}L_k} \leqslant P_1 \leqslant 0,$$

and the maximum transmission power is obtained at $D_1=0.25$ and $D_2=-0.375$;

within the entire power frequency period, the effective value of the secondary side current of the transformer corresponding to mode one is the maximum;

the mode two comprises:

when the transmission power direction is from the DC side to the AC side, the transmission power range corresponding to mode two is $$0 \leqslant P_2 \leqslant \frac{1}{4}\frac{nV_{bat}|v_g|}{4f_{sw}L_k},$$

and the maximum transmission power is obtained at $D_1=0$ and $D_2=0.25$;

when the transmission power direction is from the AC side to the DC side, the transmission power range corresponding to mode two is $$-\frac{1}{4}\frac{nV_{bat}|v_g|}{4f_{sw}L_k} \leqslant P_2 \leqslant 0,$$

and the maximum transmission power is obtained at $D_1=0$ and $D_2=-0.25$;

within the overload time period of the power frequency period, the effective value of the secondary side current of the transformer corresponding to mode two is the smallest;

the mode three comprises:

when the transmission power direction is from the DC side to the AC side, the transmission power range corresponding to mode three is $$0 \leqslant P_3 \leqslant \frac{1}{8}\frac{nV_{bat}|v_g|}{4f_{sw}L_k},$$

and the maximum transmission power is obtained at $D_1=0.25$ and $D_2=0.125$;

when the transmission power direction is from the AC side to the DC side, the transmission power range corresponding to mode three is $$-\frac{1}{8}\frac{nV_{bat}|v_g|}{4f_{sw}L_k} \leqslant P_3 \leqslant 0,$$

and the maximum transmission power is obtained at $D_1=0.25$ and $D_2=-0.125$;

within the light load time period of the power frequency period, the effective value of the secondary side current of the transformer corresponding to mode three is the smallest;

in the formula, n is the turn ratio of the secondary and primary side of the high-frequency transformer, $V_{bat}$ is the DC side battery voltage, $|v_g|$ is the absolute value of the grid-side voltage, $f_{sw}$ is the frequency of the square wave voltage of the primary and secondary sides, and $L_k$ is the inductance value of leakage inductance of the transformer converted to the secondary side.

5. The method for improving the efficiency of a micro-inverter according to claim 4, wherein switching the micro-inverter between mode three and mode two according to the instantaneous transmission power of the micro-inverter and the value of the internal phase shift angle $D_1$ comprises:

within one power frequency period, switching between modulation modes according to the instantaneous transmission power of the micro-inverter and the value of the internal phase shift angle $D_1$ according to the following principles:

when $|M| \leq D_1(1-2D_1)$, the modulation mode is switched to mode three;

when $|M| > D_1(1-2D_1)$, the modulation mode is switched to mode two;

wherein M is the transmission power ratio of the micro-inverter, defined as $$M = \frac{4f_{sw}L_k}{nV_{bat}} i_{gref} \cdot \operatorname{sgn}(v_g),$$

wherein n is the turn ratio of the secondary side and primary side of the high-frequency transformer, $V_{bat}$ is the DC side battery voltage, $f_{sw}$ is the switching frequency of the micro-inverter, $L_k$ is the inductance value of leakage inductance of the transformer converted to the secondary side, and $i_{gref}$ is the given value of the grid-side current, $\operatorname{sgn}(v_g)$ is the sign function of the grid side voltage.

6. The method for improving the efficiency of a micro-inverter according to claim 5, further comprising:

firstly, determining the variation regularity of the internal phase shift angle within the power frequency period, and then determining the variation regularity of the external phase shift angle according to the internal phase shift angle and instantaneous output power; wherein:

the variation regularity of the internal phase shift angle comprises:

$$D_1 = \max\left\{0,\, 0.5 - \frac{I_{m,ref}}{I_{m,N}} \cdot \sin(\theta + \varphi)\right\}$$

in the formula, max{ } is the function of taking the maximum value, θ is the phase of the grid voltage, q is the phase of the given value of the grid-side current, $I_{m,ref}$ is the amplitude of the given value of the grid-side current, and $I_{m,N}$ is the amplitude of the rated current of the grid-side;

the calculation method for the variation regularity of the external phase shift angle, comprising:

when the modulation mode is in mode one, the variation regularity of the external phase shift angle is:

$$D_2 = \left[\frac{1}{2} - \frac{|M|}{2(1-2D_1)}\right] \cdot \text{sgn}(M);$$

when the modulation mode is in mode two, the variation regularity of the external phase shift angle is:

$$D_2 = \frac{1-\sqrt{1-4|M|-4D_1^2}}{4} \cdot \text{sgn}(M);$$

when the modulation mode is in mode three, the variation regularity of the external phase shift angle is:

$$D_2 = \frac{|M|}{2(1-2D_1)} \cdot \text{sgn}(M);$$

wherein M is the transmission power ratio of the micro-inverter, defined as $$M = \frac{4f_{sw}L_k}{nV_{bat}} i_{gref} \cdot \text{sgn}(v_g),$$

wherein n is the turn ratio of the secondary side and primary side of the high-frequency transformer, $V_{bat}$ is the DC side battery voltage, $f_{sw}$ is the switching frequency of the micro-inverter, $L_k$ is the inductance value of leakage inductance of the transformer converted to the secondary side, and $i_{gref}$ is the given value of the grid-side current, $\text{sgn}(v_g)$ is the sign function of the grid side voltage.

7. The method for improving the efficiency of a micro-inverter according to claim 6, wherein according to the modulation mode switching characteristics of the dual-active-bridge-type micro-inverter within the power frequency period, performing a hybrid optimization of the turn ratio of the primary and secondary side of the high-frequency transformer and transformer leakage inductance of the dual-active-bridge-type micro-inverter comprises:

the turn ratio of the primary and secondary side of the high-frequency transformer is 1:n, and the inductance value of leakage inductance of the transformer converted to the secondary side is $L_k$;

the variable to be optimized n comprises s candidate values, $n=\{n_1, n_2, \ldots, n_j, \ldots, n_s\}$; the variable to be optimized $L_k$ has p candidate values, $L_k=\{L_1, L_2, \ldots, L_i, \ldots, L_p\}$;

pre-screening the candidate values of the two variables to be optimized, using the pre-screened candidate values $(L_i, n_j)$ as input variables, scanning the candidate value $n_j$ and the candidate value $L_i$, and obtaining the conduction loss of the micro-inverter within the power frequency period corresponding to the candidate values $(L_i, n_j)$;

repeating the above steps, scanning all candidate values of the variable n to be optimized and the variable $L_k$ to be optimized, the obtained input variable corresponding to the minimum conduction loss of the micro-inverter within the power frequency period is the optimal magnetic element parameter.

8. The method for improving the efficiency of a micro-inverter according to claim 7, wherein the pre-screening of candidate values of the two variables to be optimized comprises:

if the maximum transmission power $P_{max}(a,b)$ of the micro-inverter corresponding to the candidate values $(L_a, n_b)$ is less than the rated peak transmission power $P_{ac,max}$, taking the next set of candidate values $(L_{a+1}, n_1)$ when b+1>s, otherwise taking the next set of candidate values $(L_a, n_{b+1})$; repeating the process until the maximum transmission power of the micro-inverter corresponding to candidate values is greater than or equal to the rated peak transmission power;

if the maximum transmission power $P_{max}(a,b)$ of the micro-inverter corresponding to the candidate values $(L_a, n_b)$ is greater than or equal to the rated peak transmission power $P_{ac,max}$, then outputting the set of candidate values as input variables;

wherein the calculation method for the maximum transmission power $P_{max}(a,b)$ of the micro-inverter corresponding to the candidate values $(L_a, n_b)$ comprises:

$$P_{max}(a, b) = \frac{n_b V_{dc} V_m}{16 f_{sw} L_a}$$

in the formula, $n_b$ is the turn ratio of the secondary side and primary side of the high-frequency transformer in the candidate value, $f_{sw}$ is the switching frequency of the micro-inverter, $L_a$ is the inductance value of leakage inductance of the transformer converted to the secondary side, $V_{dc}$ is the DC side bus capacitance voltage, and $V_m$ is the rated voltage amplitude of the power grid.

9. The method for improving the efficiency of a micro-inverter according to claim 8, wherein scanning the candidate value $n_j$ and the candidate value $L_i$ comprises:

for the input variables $(L_i, n_j)$, determining the modulation mode of the micro-inverter for each switching period within the power frequency period;

for the input variables $(L_i, n_j)$, for each switching period within the power frequency period, calculating the effective value of the secondary side current of the transformer $$i_{s,rms}^{(i,j)}$$

and the effective value of the primary side current of the transformer $$n_j i_{s,rms}^{(i,j)}$$

under the corresponding modulation mode;

repeating the above modulation mode determination and the effective value calculation process until all switching periods within the power frequency period are traversed;

for the input variables ($L_i$, $n_j$), calculating the conduction loss of the micro-inverter within the power frequency period according to the effective value of the secondary side current of the transformer $$i_{s,rms}^{(i,j)}$$

and the effective value of the primary side current of the transformer $$n_j i_{s,rms}^{(i,j)}$$

for each switching period within the power frequency period, as well as the conduction resistance of the selected primary and secondary switching tubes.

10. The method for improving the efficiency of a micro-inverter according to claim 9, wherein calculating the effective value of the secondary side current of the transformer $$i_{s,rms}^{(i,j)}$$

and the effective value of the primary side current of the transformer $$i_{p,rms}^{(i,j)}$$

under the corresponding modulation mode, comprising:

the calculating method of the effective value of the secondary side current of the transformer $$i_{s,rms}^{(i,j)},$$

comprising:

$$i_{s,rms}^{(i,j)} = \sqrt{\frac{1}{m}\sum_{r=0}^{m-1}(i_{s,rms,r})^2}$$

wherein, m is the number of power frequency period segments; $i_{s,rms,r}$ is the effective value of the secondary side current of the transformer within the rth segment of the power frequency period, which is calculated as follows:

$$i_{s,rms,r} = \begin{cases} \text{Mode one: } \frac{\sqrt{3n_j V_{dc}|v_{g,r}|}}{6 f_{sw} L_k} \cdot \\ \sqrt{\begin{pmatrix} \left(\frac{4}{m_v}+1\right)D_1^3 + 12D_1D_2^2 - \left(\frac{3}{m_v}+\frac{3}{2}\right)D_1^2 - 12D_1D_2 - 6D_2^2 + \\ 3D_1 + 6D_2 + \left(\frac{1}{4m_v} - \frac{5}{4} + \frac{m_v}{16}\right) \end{pmatrix}} \\ \text{Mode two: } \frac{\sqrt{3n_j V_{dc}|v_{g,r}|}}{6 f_{sw} L_k} \cdot \\ \sqrt{\begin{pmatrix} \left(\frac{4}{m_v}-\frac{3}{2}\right)D_1^3 + 8D_2^3 - 6D_2D_1^2 + 6D_1D_2^2 + \\ \left(\frac{3}{2}-\frac{3}{m_v}\right)D_1^2 + 6D_2^2 + \left(\frac{1}{4m_v} - \frac{1}{4} + \frac{m_v}{16}\right) \end{pmatrix}} \\ \text{Mode three: } \frac{\sqrt{3n_j V_{dc}|v_{g,r}|}}{6 f_{sw} L_k} \cdot \\ \sqrt{\begin{pmatrix} \left(\frac{4}{m_v}-1\right)D_1^3 - 12D_1D_2^2 + \\ \left(\frac{3}{2}-\frac{3}{m_v}\right)D_1^2 + 6D_2^2 + \left(\frac{1}{4m_v} + \frac{m_v}{16} - \frac{1}{4}\right) \end{pmatrix}} \end{cases}$$

wherein $f_{sw}$ is the switching frequency of the micro-inverter, $L_k$ is the inductance value of leakage inductance of the transformer converted to the secondary side, $n_j$ is the turn ratio of the secondary side and primary side of the high-frequency transformer, $V_{dc}$ is the DC side bus capacitance voltage, $|v_{g,r}|$ is the power grid voltage at the beginning of the rth segment of the power frequency period, and $m_v$ is the voltage gain that satisfies $m_v=|v_{g,r}|/(n_jV_{dc})$;

the calculating method of the effective value of the primary side current of the transformer $$i_{p,rms}^{(i,j)},$$

comprising:

$$i_{p,rms}^{(i,j)} = n_j \cdot i_{s,rms}^{(i,j)};$$

calculating the conduction loss of the micro-inverter within the power frequency period, comprising: calculating the conduction loss of the primary side switching tube of the micro-inverter $P_{loss,pri}$, calculating the conduction loss of the secondary side switching tube of the micro-inverter $P_{loss,sec}$, and calculating the conduction loss of the micro-inverter transformer $P_{loss,tr}$, wherein:

calculating the conduction loss of the primary side switching tube of the micro-inverter $P_{loss,pri}$ comprises:

$$P_{loss,pri} = 4 \cdot \left[i_{p,rms}^{(i,j)}\right]^2 \cdot R_{ds,on,pri}$$

wherein $R_{ds,on,pri}$ is the on-resistance of a single primary side switching tube;

calculating the conduction loss of the secondary side switching tube of the micro-inverter $P_{loss,sec}$ comprises:

$$P_{loss,sec} = 4 \cdot \left[i_{s,rsm}^{(i,j)}\right]^2 \cdot R_{ds,on,sec}$$

wherein $R_{ds,on,sec}$ is the on-resistance of a single secondary side switching tube;

the conduction loss of the micro-inverter transformer $P_{loss,tr}$ comprises:

$$P_{loss,tr} = \left[i_{p,rms}^{(i,j)}\right]^2 \cdot R_{tr,pri} + \left[i_{s,rms}^{(i,j)}\right]^2 \cdot R_{tr,sec}$$

wherein $R_{tr,pri}$ and $R_{tr,sec}$ are the wire-wound resistors of the primary and secondary sides of the transformer, respectively;

a method of calculating the efficiency η of the micro-inverter under full load within an power frequency periods, comprising:

$$\eta = \frac{P_{ac,N}}{P_{ac,N} + P_{loss,pri} + P_{loss,sec} + P_{loss,tr}}$$

wherein $P_{ac,N}$ is the rated transmission power of the micro-inverter.

11. The method for improving the efficiency of a micro-inverter according to claim 7, further comprises: according to the modulation mode switching characteristics of the micro-inverter within an power frequency period, and in combination with the power point defined by the European weighted efficiency, performing a hybrid optimization design of the turn ratio of the primary and secondary side of the high-frequency transformer and transformer leakage inductance of the micro-inverter, so that the European weighted efficiency of the micro-inverter is the highest; wherein the calculation method for European weighted efficiency comprises:

measuring and calculating the efficiencies of the micro-inverter $n=\{\eta_{5\%}, \eta_{10\%}, \eta_{20\%}, \eta_{30\%}, \eta_{50\%}, \eta_{100\%}\}$ corresponding to 5%, 10%, 20%, 30%, 50% and 100% power points, and performing weighted efficiency calculation to obtain the European weighted efficiency;

wherein the 5%, 10%, 20%, 30%, 50% and 100% power points are the power points defined by European weighted efficiency, and their corresponding weighted coefficients are W={0.03, 0.06, 0.13, 0.10, 0.48, 0.20}, respectively;

pre-screening the candidate values of the two variables to be optimized, comprising:

calculating the maximum transmission power $P_{max}$(a,b) of the micro-inverter at the 100% power point corresponding to each set of candidate values ($L_a$, $n_b$);

if the maximum transmission power $P_{max}$(a,b) of the micro-inverter is less than the rated peak transmission power $P_{ac,max}$, taking the next set of candidate values ($L_{a+1}$, $n_1$) when b+1>s, otherwise taking the next set of candidate values ($L_a$, $n_{b+1}$); repeating the process until the maximum transmission power of the micro-inverter at the 100% power point corresponding to candidate values is greater than or equal to the rated peak transmission power;

if the maximum transmission power $P_{max}$(a,b) of the micro-inverter is greater than or equal to the rated peak transmission power $P_{ac,max}$, then outputting the set of candidate values as input variables;

wherein the calculation method for the maximum transmission power $P_{max}$(a,b) of the micro-inverter at the 100% power point corresponding to the candidate values ($L_a$, $n_b$) comprises:

$$P_{max}(a, b) = \frac{n_b V_{dc} V_m}{16 f_{sw} L_a}$$

in the formula, $n_b$ is the turn ratio of the secondary side and primary side of the high-frequency transformer in the candidate value, $f_{sw}$ is the switching frequency of the micro-inverter, $L_a$ is the inductance value of leakage inductance of the transformer converted to the secondary side, $V_{dc}$ is the DC side bus capacitance voltage, and $V_m$ is the rated voltage amplitude of the power grid;

scanning the candidate value $n_j$ and the candidate value $L_i$ comprises:

selecting the working power points of the micro-inverter in sequence from the working power points defined by the European weighted efficiency definition;

for the input variables ($L_i$, $n_j$), in conjunction with the selected working power points, determining the modulation mode of the micro-inverter for each switching period within the power frequency period;

for the input variables ($L_i$, $n_j$), in conjunction with the selected working power points, for each switching period within the power frequency period, calculating the effective value of the secondary side current of the transformer $$i_{s,rms}^{(i,j)}$$

and the effective value of the primary side current of the transformer $$n_j i_{s,rms}^{(i,j)}$$

under the corresponding modulation mode;

repeating the above modulation mode determination and the current effective value calculation process until all switching periods within the power frequency period are traversed;

for the input variables ($L_i$, $n_j$), in conjunction with the selected working power points, calculating the conduction loss of the micro-inverter and the micro-inverter efficiency within the power frequency period according to the effective value of the secondary side current of the transformer and the effective value of the primary side current of the transformer for each switching period within the power frequency period, as well as the conduction resistance of the selected primary and secondary switching tubes; if the selected working power point is 100% at this time, then calculating the European weighted efficiency corresponding to the input variable ($L_i$, $n_j$) according to the European weighted efficiency calculation method; otherwise, re-select the working power point of the next micro-inverter until the European weighted efficiency corresponding to the input variable ($L_i$, $n_j$) is obtained when the working power point is 100%.

12. A dual-active-bridge-type micro-inverter, comprises a dual-active-bridge-type micro-inverter body and a power modulation mode switching system;

an input end of a phase-locked loop segment is connected to the power grid, an output end of the phase-locked loop segment, after combining with the output end of the power grid current given value, is connected to an input end of a current loop segment; the input end of the feed-forward control segment is connected to the DC side battery, the combination end of the phase-locked loop segment with the output end of the power grid current given value, and the power grid, respectively; one output end of the feed-forward control segment is connected to the primary side square wave generating circuit to control the primary side square wave generating circuit to output square wave voltage, and the other output end of the feed-forward control segment, after combining with the output end of the current loop segment, is connected to the secondary side square wave generating circuit, to control the secondary square wave generating circuit to output square wave voltage, thereby realizing a given transmission power;

defining the angle between the negative rising edge of the square wave voltage generated by the primary side square wave generating circuit and the positive rising edge of the square wave voltage generated by the primary side square wave generating circuit as an internal phase shift angle $D_1$; defining the angle between the fundamental wave of the square wave voltage generated by the primary side square wave generating circuit and the fundamental wave of the square wave voltage generated by the secondary side square wave generating circuit as an external phase shift angle $D_2$; and taking the internal phase shift angle $D_1$ and the external phase shift angle $D_2$ as two control degrees of freedom of the dual-active-bridge-type micro-inverter, according to the two control degrees of freedom, dividing the modulation mode of transmission power of the dual-active-bridge-type micro-inverter into mode one, mode two and mode three, and according to the instantaneous transmission power of the dual-active-bridge-type micro-inverter and the value of the internal phase shift angle $D_1$, switching the micro-inverter between mode three and mode two.

13. The dual-active-bridge-type micro-inverter according to claim 12, wherein the power modulation mode switching system comprises:

a grid-side current given value calculation module, which passes the power grid voltage $v_g$ of the dual-active-bridge-type micro-inverter through a phase-locked loop segment to obtain the power grid voltage phase angle θ, which combines with the amplitude of the grid-side current given value $I_{m,ref}$ to obtain the grid-side current given value $i_{g,ref}$, wherein the amplitude of the grid-side current given value $I_{m,ref}$ of the dual-active-bridge-type micro-inverter is given by the higher level scheduling;

an internal phase shift angle calculation module, which subtracts the grid-side current given value $i_{g,ref}$ from the grid-side current $i_g$ of the dual-active-bridge-type micro-inverter, to obtain the external phase shift angle variation value $\Delta D_2$ through the current loop segment; and combines the DC side battery voltage $V_{bat}$, the power grid voltage $v_g$ and the grid-side current given value $i_{g,ref}$ to obtain the internal phase shift angle $D_1$ and the calculated value of the external phase shift angle $D_{2,cal}$ through the feed-forward control segment;

an external phase shift angle calculation module, which directly uses the internal phase shift angle $D_1$ to control the primary side square wave generating circuit of the dual-active-bridge-type micro-inverter to output square wave voltage, and adds the calculated value of the external phase shift angle $D_{2,cal}$ and the external phase shift angle variation value $\Delta D_2$ to obtain the external phase shift angle $D_2$, which is used to control the secondary side square wave generating circuit of the dual-active-bridge-type micro-inverter to output square wave voltage, to realize the given the transmission power of the dual-active-bridge-type micro-inverter;

a mode switching module, which takes the internal phase shift angle $D_1$ and the external phase shift angle $D_2$ as two control degrees of freedom of the dual-active-bridge-type micro-inverter, according to the two control degrees of freedom, divides the modulation mode of transmission power into mode one, mode two and mode three, and according to the instantaneous transmission power of the dual-active-bridge-type micro-inverter and the value of the internal phase shift angle $D_1$, switches the dual-active-bridge-type micro-inverter between mode three and mode two.

* * * * *